(12) United States Patent
Chen et al.

(10) Patent No.: US 10,082,644 B2
(45) Date of Patent: Sep. 25, 2018

(54) OPTICAL LENS ASSEMBLY

(71) Applicant: Genius Electronic Optical Co., Ltd., Taichung (TW)

(72) Inventors: Yu-Ming Chen, Taichung (TW); Pei-Chi Wang, Taichung (TW)

(73) Assignee: Genius Electronic Optical (Xiamen) Co., Ltd., Xiamen, Fujian (CN)

(*) Notice: Subject to any disclaimer, the term of this patent is extended or adjusted under 35 U.S.C. 154(b) by 50 days.

(21) Appl. No.: 15/455,137

(22) Filed: Mar. 10, 2017

(65) Prior Publication Data
US 2018/0231740 A1  Aug. 16, 2018

(30) Foreign Application Priority Data

Feb. 14, 2017  (CN) .......................... 2017 1 0077276

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC ...... G02B 13/0045; G02B 5/208; G02B 9/60; G02B 9/62
See application file for complete search history.

(56) References Cited

U.S. PATENT DOCUMENTS

2013/0057973 A1  3/2013  Kubota

FOREIGN PATENT DOCUMENTS

| TW | 201350901 A | 12/2013 |
|----|-------------|---------|
| TW | 201428338 A | 7/2014 |
| TW | 201437673 A | 10/2014 |
| TW | 201437674 A | 10/2014 |
| TW | 201627714 A | 8/2016 |

*Primary Examiner* — Jack Dinh
(74) *Attorney, Agent, or Firm* — Winston Hsu

(57) ABSTRACT

An optical lens assembly includes a first lens of an image-side surface with a concave portion near its optical-axis and a concave portion near its periphery, a second lens of negative refractive power and of an object-side surface with a concave portion near its periphery, a third lens of an object-side surface with a concave portion near its periphery, a fourth lens of an image-side surface with a convex portion near its optical-axis and a convex portion near its periphery, a fifth lens of positive refractive power and an image-side surface with a concave portion near its optical-axis, and a sixth lens of an image-side surface with a concave portion near its optical-axis. A total thickness of all six lens elements ALT, an air gap G56 between the fifth lens element and the sixth lens element and a sixth lens element thickness T6 satisfy $ALT/(G56+T6) \leq 2.6$.

20 Claims, 25 Drawing Sheets

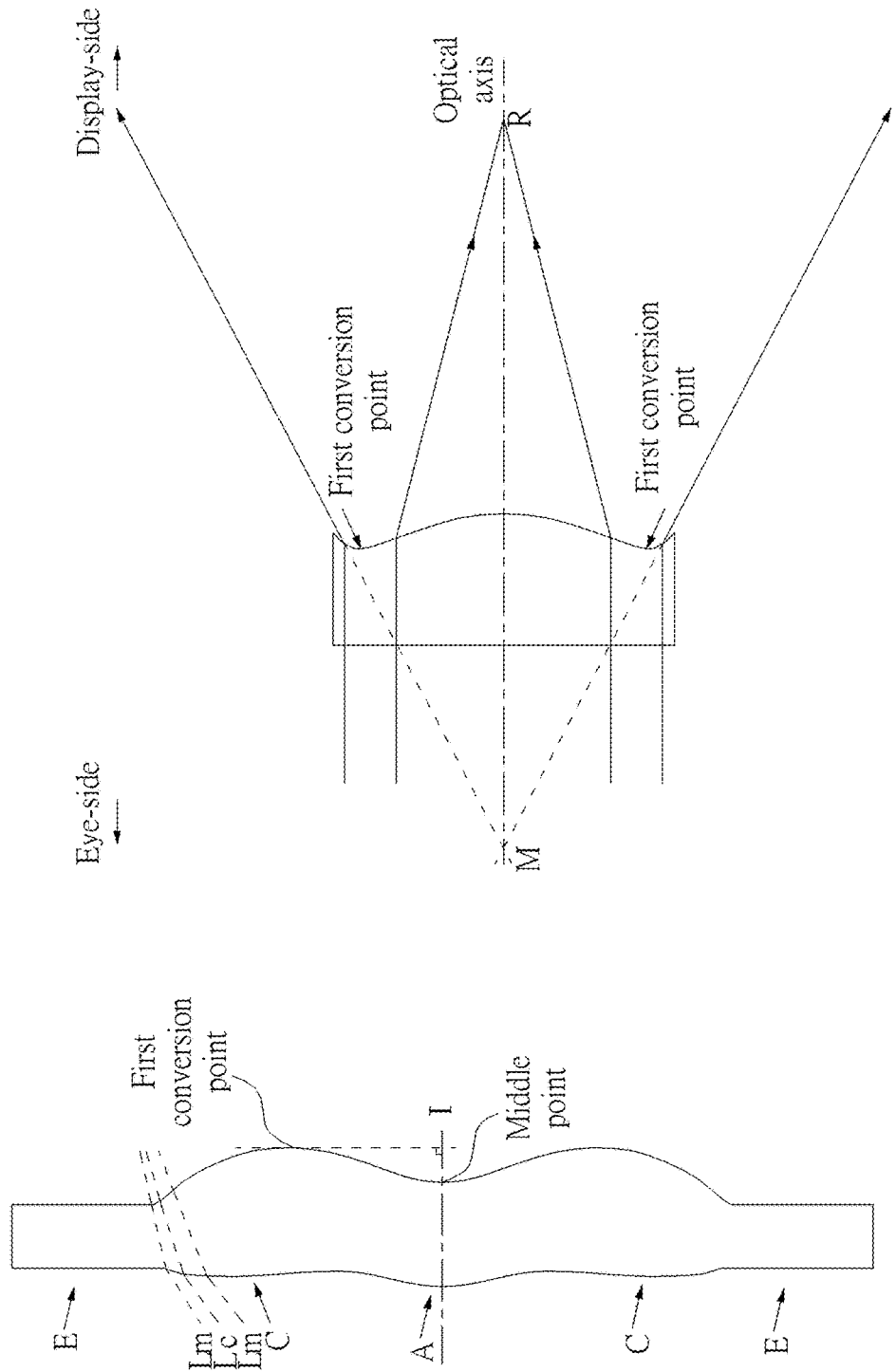

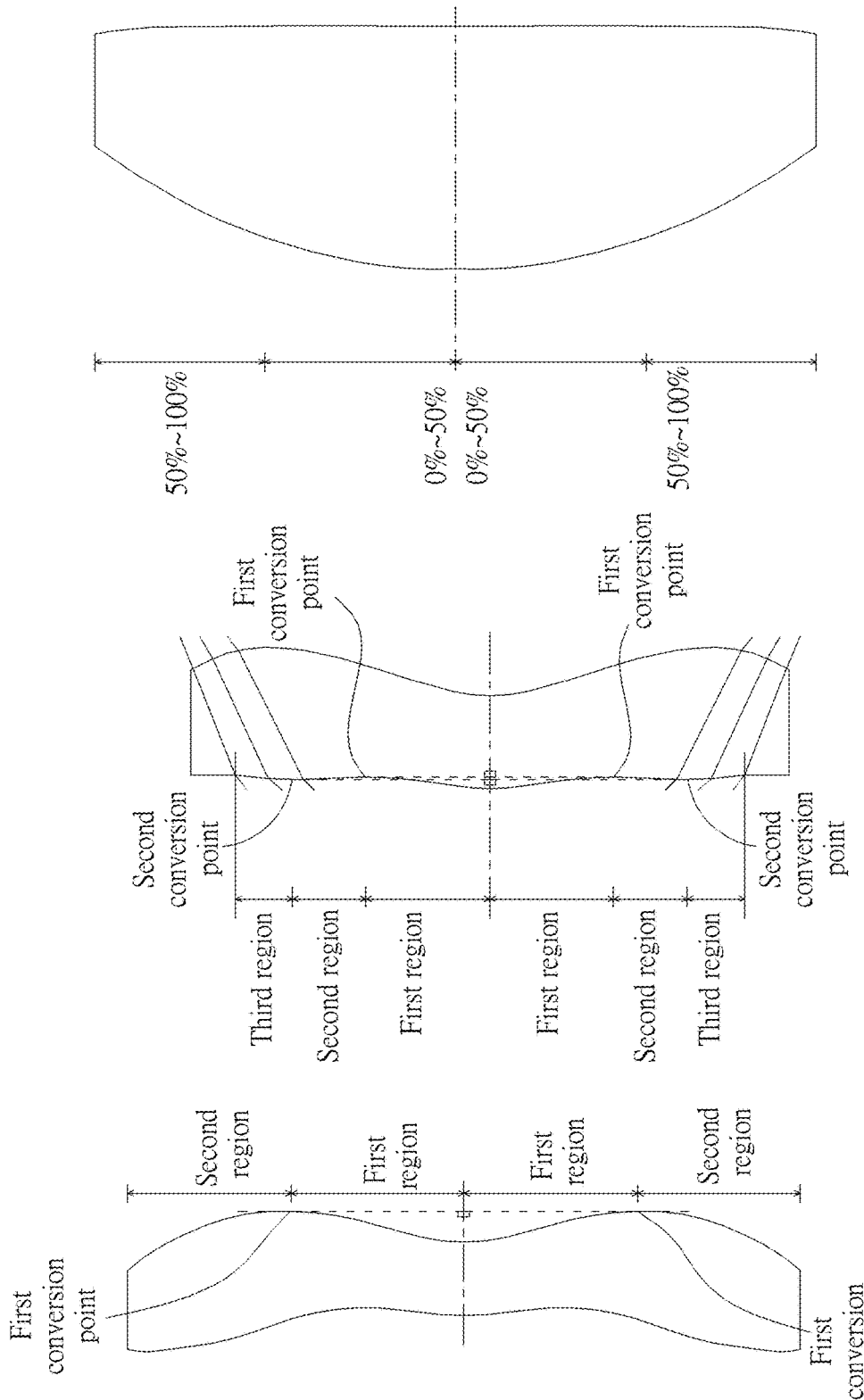

| First Example | | | | | | |
|---|---|---|---|---|---|---|
| EFL= 4.194 mm, HFOV= 40.329 Degrees, TTL= 4.982 mm, Fno= 2.049 | | | | | | |
| No. | | Curvature Radius | Ape. Stop Lens Thickness Air Gap | | Refractive Index | Abbe No. | Focal Length |
| | Object | INFINITY | INFINITY | | | | |
| 80 | Ape. Stop | INFINITY | -0.355 | | | | |
| 11 | First Lens | 1.712 | 0.495 | $T_1$ | 1.546 | 56.114 | 4.489 |
| 12 | | 5.095 | 0.195 | $G_{12}$ | | | |
| 21 | Second Lens | 4.239 | 0.263 | $T_2$ | 1.667 | 20.350 | -9.409 |
| 22 | | 2.467 | 0.215 | $G_{23}$ | | | |
| 31 | Third Lens | 7.881 | 0.467 | $T_3$ | 1.546 | 56.114 | 6.559 |
| 32 | | -6.424 | 0.379 | $G_{34}$ | | | |
| 41 | Fourth Lens | -1.712 | 0.278 | $T_4$ | 1.667 | 20.350 | -8.243 |
| 42 | | -2.647 | 0.082 | $G_{45}$ | | | |
| 51 | Fifth Lens | 1.575 | 0.363 | $T_5$ | 1.537 | 55.728 | 7.026 |
| 52 | | 2.487 | 0.647 | $G_{56}$ | | | |
| 61 | Sixth Lens | 4.682 | 0.632 | $T_6$ | 1.537 | 55.728 | -5.897 |
| 62 | | 1.799 | 0.461 | | | | |
| 70 | IR Filter | INFINITY | 0.210 | | 1.518 | 64.166 | |
| | | INFINITY | 0.296 | | | | |
| 71 | Image Plane | INFINITY | | | | | |

FIG. 20

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 1.495803E-04 | -5.287321E-02 | -1.893290E-01 | -1.559460E-01 | -1.162008E-02 | 3.143994E-02 |
| a6 | 1.468253E-02 | 1.409666E-02 | 8.120601E-02 | 7.693625E-02 | -5.155778E-02 | -2.318729E-01 |
| a8 | -1.453457E-02 | 9.343499E-02 | 7.868241E-02 | 1.014961E-02 | -7.139052E-03 | 1.057789E+00 |
| a10 | 1.332881E-02 | -1.938339E-01 | -1.469620E-01 | 3.240231E-02 | 5.778434E-02 | -3.439011E+00 |
| a12 | 0.000000E+00 | 1.837143E-01 | 1.038800E-01 | -6.394770E-02 | -3.004455E-02 | 6.667877E+00 |
| a14 | 0.000000E+00 | -6.894029E-02 | -4.238886E-02 | 2.075988E-02 | 0.000000E+00 | -7.894546E+00 |
| a16 | 0.000000E+00 | 0.000000E+00 | 0.000000E+00 | 0.000000E+00 | 0.000000E+00 | 5.625438E+00 |
| a18 | 0.000000E+00 | 0.000000E+00 | 0.000000E+00 | 0.000000E+00 | 0.000000E+00 | -2.219725E+00 |
| a20 | 0.000000E+00 | 0.000000E+00 | 0.000000E+00 | 0.000000E+00 | 0.000000E+00 | 3.728807E-01 |
| No. | 41 | 42 | 51 | 52 | 61 | 62 |
| K | 0.000000E+00 | 0.000000E+00 | -1.248170E+00 | 0.000000E+00 | 0.000000E+00 | -1.107010E+00 |
| a4 | 2.413930E-01 | -2.906776E-03 | -1.768141E-01 | 9.672893E-03 | -2.161906E-01 | -2.157907E-01 |
| a6 | -5.069846E-01 | -1.682194E-01 | 1.084461E-01 | -8.739778E-02 | 1.010232E-01 | 1.172741E-01 |
| a8 | 1.054988E+00 | 4.967064E-01 | -1.414305E-01 | 2.467904E-02 | -4.079107E-02 | -5.682400E-02 |
| a10 | -1.670341E+00 | -7.744509E-01 | 1.135710E-01 | 1.067025E-02 | 1.597197E-02 | 2.035971E-02 |
| a12 | 1.744113E+00 | 7.253234E-01 | -7.794541E-02 | -1.026517E-02 | -4.674988E-03 | -5.101459E-03 |
| a14 | -1.086698E+00 | -3.855582E-01 | 4.972163E-02 | 3.287898E-03 | 8.955930E-04 | 8.649246E-04 |
| a16 | 3.656043E-01 | 1.068449E-01 | -2.322743E-02 | -4.903226E-04 | -1.059329E-04 | -9.410844E-05 |
| a18 | -5.222831E-02 | -1.196647E-02 | 6.024742E-03 | 2.828941E-05 | 7.046339E-06 | 5.892035E-06 |
| a20 | 0.000000E+00 | 0.000000E+00 | -6.224646E-04 | 0.000000E+00 | -2.019775E-07 | -1.601527E-07 |

FIG. 21

| Second Example | | | | | | |
|---|---|---|---|---|---|---|
| EFL= 4.196 mm, HFOV= 39.016 Degrees, TTL= 4.972 mm, Fno= 2.059 | | | | | | |
| No. | | Curvature Radius | Ape. Stop Lens Thickness Air Gap | | Refractive Index | Abbe No. | Focal Length |
| | Object | INFINITY | INFINITY | | | | |
| 80 | Ape. Stop | INFINITY | -0.341 | | | | |
| 11 | First Lens | 1.712 | 0.505 | $T_1$ | 1.546 | 56.114 | 4.484 |
| 12 | | 5.097 | 0.194 | $G_{12}$ | | | |
| 21 | Second Lens | 4.237 | 0.263 | $T_2$ | 1.667 | 20.350 | -9.424 |
| 22 | | 2.468 | 0.210 | $G_{23}$ | | | |
| 31 | Third Lens | 7.865 | 0.467 | $T_3$ | 1.546 | 56.114 | 6.545 |
| 32 | | -6.410 | 0.363 | $G_{34}$ | | | |
| 41 | Fourth Lens | -1.712 | 0.278 | $T_4$ | 1.667 | 20.350 | -8.262 |
| 42 | | -2.645 | 0.082 | $G_{45}$ | | | |
| 51 | Fifth Lens | 1.575 | 0.364 | $T_5$ | 1.537 | 55.728 | 7.016 |
| 52 | | 2.488 | 0.647 | $G_{56}$ | | | |
| 61 | Sixth Lens | 4.677 | 0.614 | $T_6$ | 1.537 | 55.728 | -5.890 |
| 62 | | 1.800 | 0.461 | | | | |
| 70 | IR Filter | INFINITY | 0.210 | | 1.518 | 64.166 | |
| | | INFINITY | 0.313 | | | | |
| 71 | Image Plane | INFINITY | | | | | |

FIG. 22

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 1.367395E-02 | -3.039629E-02 | -1.339751E-01 | -1.109431E-01 | -6.297154E-02 | -6.551489E-02 |
| a6 | 3.841445E-03 | 4.732355E-03 | 9.156601E-03 | 1.461791E-02 | -4.694399E-03 | -1.517117E-02 |
| a8 | 7.590127E-04 | -9.600967E-04 | -3.805939E-03 | -3.196855E-03 | 4.013035E-04 | 2.513556E-03 |
| a10 | 1.593988E-04 | -3.584282E-04 | -8.157740E-04 | -6.303887E-04 | -8.579694E-04 | 7.794314E-04 |
| a12 | 0.000000E+00 | -1.422041E-04 | -1.205985E-04 | 6.996475E-05 | -1.943268E-04 | 7.226451E-04 |
| a14 | 0.000000E+00 | -4.012805E-05 | -3.985467E-05 | 3.580168E-05 | 0.000000E+00 | 5.574651E-04 |
| a16 | 0.000000E+00 | 0.000000E+00 | 0.000000E+00 | 0.000000E+00 | 0.000000E+00 | 3.391861E-04 |
| a18 | 0.000000E+00 | 0.000000E+00 | 0.000000E+00 | 0.000000E+00 | 0.000000E+00 | 1.526041E-04 |
| a20 | 0.000000E+00 | 0.000000E+00 | 0.000000E+00 | 0.000000E+00 | 0.000000E+00 | 8.159175E-05 |
| No. | 41 | 42 | 51 | 52 | 61 | 62 |
| K | 0.000000E+00 | 0.000000E+00 | -1.248719E+00 | 0.000000E+00 | 0.000000E+00 | -1.106975E+00 |
| a4 | 0.000000E+00 | 3.816746E-02 | -1.068936E+00 | -1.407205E+00 | -1.628906E+00 | -3.149829E+00 |
| a6 | -6.551489E-02 | 4.746379E-02 | -2.309094E-03 | 8.109592E-03 | 5.411846E-01 | 5.372820E-01 |
| a8 | -1.517117E-02 | 2.705994E-03 | 1.530038E-02 | 2.423557E-02 | -1.646422E-01 | -1.183684E-01 |
| a10 | 2.513556E-03 | -2.295570E-03 | 1.567624E-02 | -2.627239E-02 | 3.749746E-02 | 5.393029E-02 |
| a12 | 7.794310E-04 | 5.791426E-04 | 4.927973E-03 | 7.941244E-04 | -4.246542E-03 | -8.684049E-03 |
| a14 | 7.226450E-04 | 4.917768E-04 | 1.347619E-03 | -2.182831E-03 | 1.092680E-03 | 8.530175E-03 |
| a16 | 5.574650E-04 | 1.895085E-04 | -9.326640E-04 | 1.269123E-03 | -8.461191E-04 | -3.315358E-03 |
| a18 | 3.391860E-04 | -1.465900E-04 | -4.818808E-04 | 7.059917E-04 | 4.947708E-04 | 1.859096E-04 |
| a20 | 1.526040E-04 | 0.000000E+00 | -1.010990E-04 | 0.000000E+00 | -2.001984E-04 | -8.035654E-04 |

FIG. 23

| Third Example |||||||
|---|---|---|---|---|---|---|
| EFL= 3.8929 mm, HFOV= 42.3596 Degrees, TTL= 4.814 mm, Fno= 2.0588 |||||||
| No. | | Curvature Radius | Ape. Stop Lens Thickness Air Gap || Refractive Index | Abbe No. | Focal Length |
| | Object | INFINITY | INFINITY | | | | |
| 80 | Ape. Stop | INFINITY | -0.250 | | | | |
| 11 | First Lens | 1.725 | 0.502 | $T_1$ | 1.546 | 56.114 | 4.791 |
| 12 | | 4.548 | 0.189 | $G_{12}$ | | | |
| 21 | Second Lens | 3.439 | 0.256 | $T_2$ | 1.667 | 20.350 | -12.393 |
| 22 | | 2.356 | 0.205 | $G_{23}$ | | | |
| 31 | Third Lens | 8.359 | 0.447 | $T_3$ | 1.546 | 56.114 | 6.934 |
| 32 | | -6.789 | 0.355 | $G_{34}$ | | | |
| 41 | Fourth Lens | -1.732 | 0.281 | $T_4$ | 1.667 | 20.350 | -10.489 |
| 42 | | -2.452 | 0.086 | $G_{45}$ | | | |
| 51 | Fifth Lens | 1.603 | 0.406 | $T_5$ | 1.537 | 55.728 | 7.347 |
| 52 | | 2.463 | 0.680 | $G_{56}$ | | | |
| 61 | Sixth Lens | 4.726 | 0.586 | $T_6$ | 1.537 | 55.728 | -5.985 |
| 62 | | 1.830 | 0.461 | | | | |
| 70 | IR Filter | INFINITY | 0.210 | | 1.518 | 64.166 | |
| | | INFINITY | 0.150 | | | | |
| 71 | Image Plane | INFINITY | | | | | |

FIG. 24

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 1.134861E-02 | -3.026819E-02 | -1.345085E-01 | -1.102894E-01 | -6.592011E-02 | -6.872637E-02 |
| a6 | 3.692360E-03 | 4.171119E-03 | 9.501588E-03 | 1.427375E-02 | -3.810937E-03 | -1.670136E-02 |
| a8 | 1.268686E-04 | -1.167325E-03 | -3.550166E-03 | -3.269407E-03 | 5.064302E-04 | 2.429023E-03 |
| a10 | -2.729787E-05 | -3.747336E-04 | -3.898059E-04 | -7.088587E-04 | -7.945908E-04 | 6.693515E-04 |
| a12 | 0.000000E+00 | -8.094768E-05 | -6.029426E-05 | -1.164988E-04 | -1.958738E-04 | 1.025214E-03 |
| a14 | 0.000000E+00 | -3.513612E-05 | 3.291184E-05 | 1.504126E-05 | 0.000000E+00 | 5.439025E-04 |
| a16 | 0.000000E+00 | 0.000000E+00 | 0.000000E+00 | 0.000000E+00 | 0.000000E+00 | 4.695143E-04 |
| a18 | 0.000000E+00 | 0.000000E+00 | 0.000000E+00 | 0.000000E+00 | 0.000000E+00 | 1.977370E-04 |
| a20 | 0.000000E+00 | 0.000000E+00 | 0.000000E+00 | 0.000000E+00 | 0.000000E+00 | 1.803494E-04 |
| No. | 41 | 42 | 51 | 52 | 61 | 62 |
| K | 0.000000E+00 | 0.000000E+00 | -1.262966E+00 | 0.000000E+00 | 0.000000E+00 | -1.109514E+00 |
| a4 | 1.791271E-01 | 4.479805E-02 | -1.072114E+00 | -1.406581E+00 | -1.635363E+00 | -3.152178E+00 |
| a6 | -2.484758E-02 | 4.669442E-02 | -7.193344E-03 | 1.033399E-02 | 5.401940E-01 | 5.387843E-01 |
| a8 | 1.067968E-03 | 3.097528E-03 | 1.457742E-02 | 2.463194E-02 | -1.649583E-01 | -1.176548E-01 |
| a10 | -5.115500E-03 | -2.368771E-03 | 1.562068E-02 | -2.308790E-02 | 3.733263E-02 | 5.101073E-02 |
| a12 | -6.135611E-04 | 3.392513E-04 | 5.015207E-03 | 1.232986E-03 | -4.956015E-03 | -9.891857E-03 |
| a14 | -3.765397E-04 | 4.797022E-04 | 1.390074E-03 | -2.141490E-03 | 9.968785E-04 | 7.661545E-03 |
| a16 | 1.272478E-04 | 2.700469E-04 | -9.044059E-04 | 9.870448E-04 | -8.167994E-04 | -3.439925E-03 |
| a18 | 4.419828E-05 | 9.461553E-05 | -3.723812E-04 | 7.057669E-04 | 5.421992E-04 | 2.804390E-04 |
| a20 | 0.000000E+00 | 0.000000E+00 | -8.342911E-05 | 0.000000E+00 | -1.722511E-04 | -5.395131E-04 |

FIG. 25

| Fourth Example ||||||
|---|---|---|---|---|---|
| EFL= 3.9228 mm, HFOV= 40.2938 Degrees, TTL= 4.855 mm, Fno= 2.0488 ||||||
| No. | | Curvature Radius | Ape. Stop Lens Thickness Air Gap | Refractive Index | Abbe No. | Focal Length |
| | Object | INFINITY | INFINITY | | | |
| 80 | Ape. Stop | INFINITY | -0.264 | | | |
| 11 | First Lens | 1.723 | 0.496 | $T_1$ | 1.546 | 56.114 | 4.851 |
| 12 | | 4.432 | 0.195 | $G_{12}$ | | | |
| 21 | Second Lens | 3.584 | 0.271 | $T_2$ | 1.667 | 20.350 | -13.302 |
| 22 | | 2.476 | 0.220 | $G_{23}$ | | | |
| 31 | Third Lens | 9.007 | 0.471 | $T_3$ | 1.546 | 56.114 | 6.738 |
| 32 | | -6.103 | 0.356 | $G_{34}$ | | | |
| 41 | Fourth Lens | -1.687 | 0.263 | $T_4$ | 1.667 | 20.350 | -8.612 |
| 42 | | -2.538 | 0.085 | $G_{45}$ | | | |
| 51 | Fifth Lens | 1.586 | 0.396 | $T_5$ | 1.537 | 55.728 | 6.828 |
| 52 | | 2.550 | 0.602 | $G_{56}$ | | | |
| 61 | Sixth Lens | 4.737 | 0.626 | $T_6$ | 1.537 | 55.728 | -6.407 |
| 62 | | 1.901 | 0.461 | | | | |
| 70 | IR Filter | INFINITY | 0.210 | | 1.518 | 64.166 | |
| | | INFINITY | 0.203 | | | | |
| 71 | Image Plane | INFINITY | | | | | |

FIG. 26

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 8.204883E-04 | -4.539101E-02 | -1.886127E-01 | -1.573729E-01 | -1.308868E-02 | 5.302096E-02 |
| a6 | 1.171579E-02 | -5.647306E-03 | 6.833425E-02 | 1.265231E-01 | -7.332043E-02 | -3.422961E-01 |
| a8 | -1.097055E-02 | 1.017929E-01 | 1.672278E-01 | -1.472037E-01 | 5.830272E-02 | 1.137759E+00 |
| a10 | 1.167757E-02 | -1.654824E-01 | -3.663165E-01 | 2.419356E-01 | -1.040930E-02 | -2.770150E+00 |
| a12 | 0.000000E+00 | 1.473633E-01 | 3.265363E-01 | -1.948805E-01 | -4.824999E-03 | 4.552542E+00 |
| a14 | 0.000000E+00 | -5.684988E-02 | -1.224202E-01 | 5.271812E-02 | 0.000000E+00 | -4.980267E+00 |
| a16 | 0.000000E+00 | 0.000000E+00 | 0.000000E+00 | 0.000000E+00 | 0.000000E+00 | 3.447755E+00 |
| a18 | 0.000000E+00 | 0.000000E+00 | 0.000000E+00 | 0.000000E+00 | 0.000000E+00 | -1.356596E+00 |
| a20 | 0.000000E+00 | 0.000000E+00 | 0.000000E+00 | 0.000000E+00 | 0.000000E+00 | 2.300414E-01 |
| No. | 41 | 42 | 51 | 52 | 61 | 62 |
| K | 0.000000E+00 | 0.000000E+00 | -1.274333E+00 | 0.000000E+00 | 0.000000E+00 | -1.092437E+00 |
| a4 | 2.252165E-01 | 7.236775E-04 | -1.957256E-01 | 1.381538E-02 | -2.217677E-01 | -2.181226E-01 |
| a6 | -4.491129E-01 | -1.477144E-01 | 2.180528E-01 | -1.062072E-01 | 1.066862E-01 | 1.148579E-01 |
| a8 | 9.510843E-01 | 3.801424E-01 | -4.240041E-01 | 5.288850E-02 | -4.380728E-02 | -5.228696E-02 |
| a10 | -1.590744E+00 | -5.421992E-01 | 5.169903E-01 | -1.027834E-02 | 1.669530E-02 | 1.731019E-02 |
| a12 | 1.797257E+00 | 4.861525E-01 | -4.203444E-01 | -1.430970E-03 | -4.639180E-03 | -4.024986E-03 |
| a14 | -1.235742E+00 | -2.509531E-01 | 2.268676E-01 | 1.127530E-03 | 8.339227E-04 | 6.469325E-04 |
| a16 | 4.670420E-01 | 6.769344E-02 | -7.797619E-02 | -2.059831E-04 | -9.185773E-05 | -6.864666E-05 |
| a18 | -7.555292E-02 | -7.371049E-03 | 1.529621E-02 | 1.279194E-05 | 5.667882E-06 | 4.300107E-06 |
| a20 | 0.000000E+00 | 0.000000E+00 | -1.283556E-03 | 0.000000E+00 | -1.507546E-07 | -1.190213E-07 |

FIG. 27

| Fifth Example |||||||
|---|---|---|---|---|---|---|
| EFL= 4.2042 mm, HFOV= 40.335 Degrees, TTL= 4.99 mm, Fno= 2.0487 |||||||
| No. | | Curvature Radius | Ape. Stop Lens Thickness Air Gap | | Refractive Index | Abbe No. | Focal Length |
| | Object | INFINITY | INFINITY | | | | |
| 80 | Ape. Stop | INFINITY | -0.344 | | | | |
| 11 | First Lens | 1.717 | 0.510 | $T_1$ | 1.546 | 56.114 | 4.513 |
| 12 | | 5.071 | 0.195 | $G_{12}$ | | | |
| 21 | Second Lens | 4.186 | 0.261 | $T_2$ | 1.667 | 20.350 | -9.570 |
| 22 | | 2.465 | 0.215 | $G_{23}$ | | | |
| 31 | Third Lens | 7.929 | 0.468 | $T_3$ | 1.546 | 56.114 | 6.586 |
| 32 | | -6.443 | 0.381 | $G_{34}$ | | | |
| 41 | Fourth Lens | -1.716 | 0.279 | $T_4$ | 1.667 | 20.350 | -8.293 |
| 42 | | -2.650 | 0.082 | $G_{45}$ | | | |
| 51 | Fifth Lens | 1.581 | 0.366 | $T_5$ | 1.537 | 55.728 | 7.047 |
| 52 | | 2.497 | 0.641 | $G_{56}$ | | | |
| 61 | Sixth Lens | 4.697 | 0.619 | $T_6$ | 1.537 | 55.728 | -5.914 |
| 62 | | 1.807 | 0.461 | | | | |
| 70 | IR Filter | INFINITY | 0.211 | | 1.518 | 64.166 | |
| | | INFINITY | 0.303 | | | | |
| 71 | Image Plane | INFINITY | | | | | |

FIG. 28

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 1.890580E-04 | -5.353236E-02 | -1.867445E-01 | -1.550750E-01 | -1.116146E-02 | 3.627356E-02 |
| a6 | 1.410282E-02 | 2.576920E-02 | 7.122895E-02 | 8.043357E-02 | -5.263905E-02 | -3.091999E-01 |
| a8 | -1.361485E-02 | 4.786342E-02 | 1.086879E-01 | -5.559554E-03 | -3.350139E-03 | 1.570484E+00 |
| a10 | 1.262827E-02 | -1.143237E-01 | -1.966740E-01 | 5.591923E-02 | 5.291763E-02 | -5.226286E+00 |
| a12 | 0.000000E+00 | 1.179798E-01 | 1.435032E-01 | -7.991976E-02 | -2.787637E-02 | 1.026775E+01 |
| a14 | 0.000000E+00 | -4.799388E-02 | -5.386491E-02 | 2.498685E-02 | 0.000000E+00 | -1.220945E+01 |
| a16 | 0.000000E+00 | 0.000000E+00 | 0.000000E+00 | 0.000000E+00 | 0.000000E+00 | 8.655905E+00 |
| a18 | 0.000000E+00 | 0.000000E+00 | 0.000000E+00 | 0.000000E+00 | 0.000000E+00 | -3.368993E+00 |
| a20 | 0.000000E+00 | 0.000000E+00 | 0.000000E+00 | 0.000000E+00 | 0.000000E+00 | 5.542763E-01 |
| No. | 41 | 42 | 51 | 52 | 61 | 62 |
| K | 0.000000E+00 | 0.000000E+00 | -1.248511E+00 | 0.000000E+00 | 0.000000E+00 | -1.106847E+00 |
| a4 | 2.419282E-01 | -8.546971E-03 | -1.752572E-01 | 9.720553E-03 | -2.137367E-01 | -2.148744E-01 |
| a6 | -5.247910E-01 | -1.128119E-01 | 1.070520E-01 | -8.634290E-02 | 9.912673E-02 | 1.164111E-01 |
| a8 | 1.121590E+00 | 2.954016E-01 | -1.391559E-01 | 2.388605E-02 | -3.970377E-02 | -5.625060E-02 |
| a10 | -1.789902E+00 | -3.999013E-01 | 1.116247E-01 | 1.102383E-02 | 1.541822E-02 | 2.010176E-02 |
| a12 | 1.867648E+00 | 3.334646E-01 | -7.645090E-02 | -1.038152E-02 | -4.475689E-03 | -5.023546E-03 |
| a14 | -1.163628E+00 | -1.535891E-01 | 4.846247E-02 | 3.313751E-03 | 8.501982E-04 | 8.493189E-04 |
| a16 | 3.926358E-01 | 3.442310E-02 | -2.245669E-02 | -4.935675E-04 | -9.969127E-05 | -9.212770E-05 |
| a18 | -5.627238E-02 | -2.709409E-03 | 5.780370E-03 | 2.846455E-05 | 6.571838E-06 | 5.749023E-06 |
| a20 | 0.000000E+00 | 0.000000E+00 | -5.931032E-04 | 0.000000E+00 | -1.866439E-07 | -1.557230E-07 |

FIG. 29

| Sixth Example ||||||||
|---|---|---|---|---|---|---|---|
| | EFL= 4.2140 mm, HFOV= 40.4391 Degrees, TTL= 4.978 mm, Fno= 2.0487 ||||||||
| No. | | Curvature Radius | Ape. Stop Lens Thickness Air Gap | | Refractive Index | Abbe No. | Focal Length |
| | Object | INFINITY | INFINITY | | | | |
| 80 | Ape. Stop | INFINITY | -0.357 | | | | |
| 11 | First Lens | 1.713 | 0.513 | $T_1$ | 1.546 | 56.114 | 4.494 |
| 12 | | 5.075 | 0.190 | $G_{12}$ | | | |
| 21 | Second Lens | 4.253 | 0.259 | $T_2$ | 1.667 | 20.350 | -9.640 |
| 22 | | 2.498 | 0.214 | $G_{23}$ | | | |
| 31 | Third Lens | 8.427 | 0.466 | $T_3$ | 1.546 | 56.114 | 6.678 |
| 32 | | -6.300 | 0.370 | $G_{34}$ | | | |
| 41 | Fourth Lens | -1.719 | 0.279 | $T_4$ | 1.667 | 20.350 | -8.464 |
| 42 | | -2.631 | 0.101 | $G_{45}$ | | | |
| 51 | Fifth Lens | 1.579 | 0.371 | $T_5$ | 1.537 | 55.728 | 7.022 |
| 52 | | 2.495 | 0.673 | $G_{56}$ | | | |
| 61 | Sixth Lens | 4.703 | 0.554 | $T_6$ | 1.537 | 55.728 | -5.866 |
| 62 | | 1.808 | 0.461 | | | | |
| 70 | IR Filter | INFINITY | 0.210 | | 1.518 | 64.166 | |
| | | INFINITY | 0.315 | | | | |
| 71 | Image Plane | INFINITY | | | | | |

FIG. 30

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 7.298405E-05 | -5.774686E-02 | -1.870757E-01 | -1.554961E-01 | -1.266673E-02 | 4.176096E-02 |
| a6 | 1.509064E-02 | 5.544932E-02 | 5.523201E-02 | 7.265336E-02 | -5.341564E-02 | -3.140594E-01 |
| a8 | -1.482424E-02 | -5.170434E-02 | 1.735959E-01 | 3.384764E-02 | 2.278924E-03 | 1.405436E+00 |
| a10 | 1.329110E-02 | 5.358976E-02 | -3.010890E-01 | -1.343160E-02 | 4.679732E-02 | -4.296901E+00 |
| a12 | 0.000000E+00 | -1.886713E-02 | 2.187327E-01 | -2.576506E-02 | -2.584877E-02 | 7.958220E+00 |
| a14 | 0.000000E+00 | -5.406531E-03 | -7.444514E-02 | 9.058681E-03 | 0.000000E+00 | -9.092837E+00 |
| a16 | 0.000000E+00 | 0.000000E+00 | 0.000000E+00 | 0.000000E+00 | 0.000000E+00 | 6.294934E+00 |
| a18 | 0.000000E+00 | 0.000000E+00 | 0.000000E+00 | 0.000000E+00 | 0.000000E+00 | -2.425524E+00 |
| a20 | 0.000000E+00 | 0.000000E+00 | 0.000000E+00 | 0.000000E+00 | 0.000000E+00 | 3.995184E-01 |
| No. | 41 | 42 | 51 | 52 | 61 | 62 |
| K | 0.000000E+00 | 0.000000E+00 | -1.280499E+00 | 0.000000E+00 | 0.000000E+00 | -1.106996E+00 |
| a4 | 2.484322E-01 | 5.273691E-05 | -1.821906E-01 | 1.753291E-03 | -2.110753E-01 | -2.125345E-01 |
| a6 | -6.024632E-01 | -1.895305E-01 | 1.241475E-01 | -7.689066E-02 | 9.584862E-02 | 1.107914E-01 |
| a8 | 1.441183E+00 | 5.663439E-01 | -1.757432E-01 | 2.195258E-02 | -3.634744E-02 | -4.987516E-02 |
| a10 | -2.501962E+00 | -8.894042E-01 | 1.709165E-01 | 7.944841E-03 | 1.321823E-02 | 1.622511E-02 |
| a12 | 2.778731E+00 | 8.301748E-01 | -1.359479E-01 | -7.785132E-03 | -3.622878E-03 | -3.662690E-03 |
| a14 | -1.833821E+00 | -4.388224E-01 | 8.390324E-02 | 2.445798E-03 | 6.523178E-04 | 5.631848E-04 |
| a16 | 6.574257E-01 | 1.210906E-01 | -3.460363E-02 | -3.576788E-04 | -7.255757E-05 | -5.653975E-05 |
| a18 | -1.000647E-01 | -1.354793E-02 | 7.986718E-03 | 2.026901E-05 | 4.540523E-06 | 3.339683E-06 |
| a20 | 0.000000E+00 | 0.000000E+00 | -7.575833E-04 | 0.000000E+00 | -1.226108E-07 | -8.747107E-08 |

FIG. 31

| \multicolumn{7}{c}{Seventh Example} |
|---|---|---|---|---|---|---|
| \multicolumn{7}{c}{EFL= 4.2375 mm, HFOV= 40.2916 Degrees, TTL= 5.002 mm, Fno= 2.0487} |
| No. | | Curvature Radius | Ape. Stop Lens Thickness Air Gap | | Refractive Index | Abbe No. | Focal Length |
| | Object | INFINITY | INFINITY | | | | |
| 80 | Ape. Stop | INFINITY | -0.362 | | | | |
| 11 | First Lens | 1.713 | 0.511 | $T_1$ | 1.546 | 56.114 | 4.554 |
| 12 | | 4.931 | 0.190 | $G_{12}$ | | | |
| 21 | Second Lens | 4.176 | 0.253 | $T_2$ | 1.667 | 20.350 | -10.029 |
| 22 | | 2.509 | 0.213 | $G_{23}$ | | | |
| 31 | Third Lens | 8.402 | 0.467 | $T_3$ | 1.546 | 56.114 | 6.687 |
| 32 | | -6.330 | 0.362 | $G_{34}$ | | | |
| 41 | Fourth Lens | -1.723 | 0.302 | $T_4$ | 1.667 | 20.350 | -8.670 |
| 42 | | -2.626 | 0.100 | $G_{45}$ | | | |
| 51 | Fifth Lens | 1.587 | 0.358 | $T_5$ | 1.537 | 55.728 | 7.045 |
| 52 | | 2.520 | 0.661 | $G_{56}$ | | | |
| 61 | Sixth Lens | 4.687 | 0.546 | $T_6$ | 1.537 | 55.728 | -5.900 |
| 62 | | 1.813 | 0.461 | | | | |
| 70 | IR Filter | INFINITY | 0.210 | | 1.518 | 64.166 | |
| | | INFINITY | 0.368 | | | | |
| 71 | Image Plane | INFINITY | | | | | |

FIG. 32

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | -2.848263E-04 | -5.772896E-02 | -1.862845E-01 | -1.552418E-01 | -1.244600E-02 | 4.577186E-02 |
| a6 | 1.634348E-02 | 5.543505E-02 | 4.928740E-02 | 6.719877E-02 | -5.788092E-02 | -3.343970E-01 |
| a8 | -1.624366E-02 | -4.754840E-02 | 1.942653E-01 | 5.539701E-02 | 1.319541E-02 | 1.482388E+00 |
| a10 | 1.384376E-02 | 4.059355E-02 | -3.367364E-01 | -4.846890E-02 | 3.659811E-02 | -4.522369E+00 |
| a12 | 0.000000E+00 | -5.205703E-03 | 2.475825E-01 | 2.663478E-04 | -2.252656E-02 | 8.400836E+00 |
| a14 | 0.000000E+00 | -1.021146E-02 | -8.311518E-02 | 1.766868E-03 | 0.000000E+00 | -9.638544E+00 |
| a16 | 0.000000E+00 | 0.000000E+00 | 0.000000E+00 | 0.000000E+00 | 0.000000E+00 | 6.699371E+00 |
| a18 | 0.000000E+00 | 0.000000E+00 | 0.000000E+00 | 0.000000E+00 | 0.000000E+00 | -2.589987E+00 |
| a20 | 0.000000E+00 | 0.000000E+00 | 0.000000E+00 | 0.000000E+00 | 0.000000E+00 | 4.276828E-01 |
| No. | 41 | 42 | 51 | 52 | 61 | 62 |
| K | 0.000000E+00 | 0.000000E+00 | -1.279711E+00 | 0.000000E+00 | 0.000000E+00 | -1.101284E+00 |
| a4 | 2.505397E-01 | -1.937910E-04 | -1.866710E-01 | 4.845881E-04 | -2.114611E-01 | -2.137841E-01 |
| a6 | -6.064454E-01 | -1.842955E-01 | 1.420956E-01 | -7.346021E-02 | 9.605058E-02 | 1.123897E-01 |
| a8 | 1.412799E+00 | 5.337675E-01 | -2.101611E-01 | 1.832017E-02 | -3.645053E-02 | -5.107247E-02 |
| a10 | -2.390463E+00 | -8.096512E-01 | 2.107744E-01 | 1.015836E-02 | 1.326916E-02 | 1.685206E-02 |
| a12 | 2.608168E+00 | 7.346853E-01 | -1.647414E-01 | -8.604984E-03 | -3.641782E-03 | -3.874396E-03 |
| a14 | -1.698384E+00 | -3.782614E-01 | 9.685732E-02 | 2.629600E-03 | 6.568575E-04 | 6.073074E-04 |
| a16 | 6.018659E-01 | 1.014907E-01 | -3.808061E-02 | -3.804670E-04 | -7.322507E-05 | -6.202380E-05 |
| a18 | -9.073944E-02 | -1.099456E-02 | 8.487919E-03 | 2.146662E-05 | 4.595581E-06 | 3.712867E-06 |
| a20 | 0.000000E+00 | 0.000000E+00 | -7.869034E-04 | 0.000000E+00 | -1.245589E-07 | -9.817821E-08 |

FIG. 33

| Example | First | Second | Third | Fourth | Fifth | Sixth | Seventh |
|---|---|---|---|---|---|---|---|
| f | 4.194 | 4.196 | 3.893 | 3.923 | 4.204 | 4.214 | 4.238 |
| Fno | 2.049 | 2.059 | 2.059 | 2.049 | 2.049 | 2.049 | 2.049 |
| HFOV | 40.329 | 39.016 | 42.360 | 40.294 | 40.335 | 40.439 | 40.292 |
| T1 | 0.495 | 0.505 | 0.502 | 0.496 | 0.510 | 0.513 | 0.511 |
| G12 | 0.195 | 0.194 | 0.189 | 0.195 | 0.195 | 0.190 | 0.190 |
| T2 | 0.263 | 0.263 | 0.256 | 0.271 | 0.261 | 0.259 | 0.253 |
| G23 | 0.215 | 0.210 | 0.205 | 0.220 | 0.215 | 0.214 | 0.213 |
| T3 | 0.467 | 0.467 | 0.447 | 0.471 | 0.468 | 0.466 | 0.467 |
| G34 | 0.379 | 0.363 | 0.355 | 0.356 | 0.381 | 0.370 | 0.362 |
| T4 | 0.278 | 0.278 | 0.281 | 0.263 | 0.279 | 0.279 | 0.302 |
| G45 | 0.082 | 0.082 | 0.086 | 0.085 | 0.082 | 0.101 | 0.100 |
| T5 | 0.363 | 0.364 | 0.406 | 0.396 | 0.366 | 0.371 | 0.358 |
| G56 | 0.647 | 0.647 | 0.680 | 0.602 | 0.641 | 0.673 | 0.661 |
| T6 | 0.632 | 0.614 | 0.586 | 0.626 | 0.619 | 0.554 | 0.546 |
| G67 | 0.461 | 0.461 | 0.461 | 0.461 | 0.461 | 0.461 | 0.461 |
| TF | 0.210 | 0.210 | 0.210 | 0.210 | 0.211 | 0.210 | 0.210 |
| GFP | 0.296 | 0.313 | 0.150 | 0.203 | 0.303 | 0.315 | 0.368 |
| ALT | 2.498 | 2.490 | 2.478 | 2.522 | 2.502 | 2.442 | 2.436 |
| AAG | 1.517 | 1.497 | 1.515 | 1.458 | 1.514 | 1.549 | 1.526 |
| BFL | 0.968 | 0.985 | 0.821 | 0.875 | 0.974 | 0.987 | 1.039 |
| TTL | 4.982 | 4.972 | 4.814 | 4.855 | 4.990 | 4.978 | 5.002 |
| TL | 4.014 | 3.987 | 3.993 | 3.980 | 4.016 | 3.991 | 3.962 |
| Tmax | 0.632 | 0.614 | 0.586 | 0.626 | 0.619 | 0.554 | 0.546 |
| Tmin | 0.263 | 0.263 | 0.256 | 0.263 | 0.261 | 0.259 | 0.253 |
| Gmax | 0.647 | 0.647 | 0.680 | 0.602 | 0.641 | 0.673 | 0.661 |

FIG. 34

| | First | Second | Third | Fourth | Fifth | Sixth | Seventh | min | MAX |
|---|---|---|---|---|---|---|---|---|---|
| ALT / (G56+T6) | 1.953 | 1.975 | 1.958 | 2.055 | 1.987 | 1.989 | 2.019 | 1.953 | 2.055 |
| Tmax / G12 | 3.245 | 3.161 | 3.092 | 3.213 | 3.177 | 2.916 | 2.875 | 2.875 | 3.245 |
| Tmax / G23 | 2.943 | 2.924 | 2.855 | 2.842 | 2.876 | 2.588 | 2.563 | 2.563 | 2.943 |
| (T1+T6) / G12 | 5.785 | 5.760 | 5.740 | 5.757 | 5.797 | 5.612 | 5.565 | 5.565 | 5.797 |
| TTL / (T3+T6) | 4.534 | 4.600 | 4.659 | 4.429 | 4.594 | 4.878 | 4.938 | 4.429 | 4.938 |
| TTL / (G23+G34) | 8.392 | 8.672 | 8.595 | 8.427 | 8.372 | 8.521 | 8.694 | 8.372 | 8.694 |
| TTL / (G34+G56) | 4.858 | 4.921 | 4.651 | 5.069 | 4.885 | 4.770 | 4.889 | 4.651 | 5.069 |
| EFL / (T2+T6) | 4.685 | 4.783 | 4.624 | 4.373 | 4.781 | 5.183 | 5.303 | 4.373 | 5.303 |
| EFL / T2 | 15.941 | 15.940 | 15.200 | 14.453 | 16.122 | 16.285 | 16.748 | 14.453 | 16.748 |
| BFL / T5 | 2.666 | 2.709 | 2.021 | 2.206 | 2.660 | 2.657 | 2.901 | 2.021 | 2.901 |
| BFL / T6 | 1.531 | 1.604 | 1.401 | 1.398 | 1.575 | 1.780 | 1.903 | 1.398 | 1.903 |
| ALT / Tmin | 9.494 | 9.461 | 9.675 | 9.598 | 9.595 | 9.439 | 9.630 | 9.439 | 9.675 |
| ALT / G56 | 3.863 | 3.849 | 3.644 | 4.192 | 3.906 | 3.626 | 3.688 | 3.626 | 4.192 |
| ALT / Gmax | 3.863 | 3.849 | 3.644 | 4.192 | 3.906 | 3.626 | 3.688 | 3.626 | 4.192 |
| TL / T6 | 6.351 | 6.493 | 6.816 | 6.362 | 6.492 | 7.200 | 7.257 | 6.351 | 7.257 |
| TL / (G45+G56) | 5.513 | 5.468 | 5.215 | 5.794 | 5.556 | 5.153 | 5.209 | 5.153 | 5.794 |
| TL / (T2+T6) | 4.484 | 4.545 | 4.743 | 4.437 | 4.567 | 4.909 | 4.959 | 4.437 | 4.959 |
| AAG / T2 | 5.764 | 5.686 | 5.916 | 5.371 | 5.804 | 5.986 | 6.031 | 5.371 | 6.031 |
| AAG / Tmin | 5.764 | 5.686 | 5.916 | 5.547 | 5.804 | 5.986 | 6.031 | 5.547 | 6.031 |
| AAG / (T4+T6) | 1.667 | 1.678 | 1.748 | 1.641 | 1.687 | 1.858 | 1.800 | 1.641 | 1.858 |

OPTICAL LENS ASSEMBLY

BACKGROUND OF THE INVENTION

1. Field of the Invention

The present invention generally relates to an optical imaging lens set. Specifically speaking, the present invention is directed to an optical imaging lens assembly for use in portable electronic devices such as mobile phones, cameras, tablet personal or personal digital assistants (PDA) for taking pictures and for recording videos.

2. Description of the Prior Art

The specifications of portable electronic devices change all the time and the key element—optical imaging lens assembly develops variously so a good imaging quality is needed as well as a smaller size. As far as the imaging quality is concerned, the demands for better imaging quality are getting higher and higher with the development of optical technology. To take an optical imaging lens assembly of six lens elements for example, there is a longer distance from the object-side surface of the first lens element to an image plane in the conventional design and it is adverse to the thinner design of the cell phones and digital cameras.

Therefore, how to reduce the total length of a photographic device, but still maintain good optical performance under dim light background, is an important objective to research.

SUMMARY OF THE INVENTION

In light of the above, the present invention proposes an optical imaging lens assembly of six lens elements which is shorter in total length, technically possible and has good optical performance. The optical imaging lens assembly of six lens elements of the present invention from an object side toward an image side in order along an optical axis has a first lens element, a second lens element, a third lens element, a fourth lens element, a fifth lens element and a sixth lens element. Each lens element respectively has an object-side surface which faces toward an object side as well as an image-side surface which faces toward an image side.

The first lens element has an image-side surface with a concave portion in a vicinity of the optical-axis and with a concave portion in a vicinity of its periphery. The second lens element has negative refractive power and an object-side surface with a concave portion in a vicinity of its periphery. The third lens element has an object-side surface with a concave portion in a vicinity of its periphery. The fourth lens element has an image-side surface with a convex portion in a vicinity of the optical-axis and with a convex portion in a vicinity of its periphery. The fifth lens element has positive refractive power and an image-side surface with a concave portion in a vicinity of the optical-axis. The sixth lens element has an image-side surface with a concave portion in a vicinity of the optical-axis.

The optical imaging lens assembly exclusively has six lens elements with refractive power. ALT is a total thickness of all the six lens elements from the first lens element to the sixth lens element, an air gap G56 is disposed between the fifth lens element and the sixth lens element and the sixth lens element has a sixth lens element thickness T6 to satisfy ALT/(G56+T6)≤2.6.

In the optical imaging lens assembly of six lens elements of the present invention, Tmax is the maximal lens element thickness among the first lens element and the sixth lens element and an air gap G12 between the first lens element and the second lens element along the optical axis to satisfy Tmax/G12≤3.30.

In the optical imaging lens assembly of six lens elements of the present invention, an air gap G23 between the second lens element and the third lens element along the optical axis to satisfy Tmax/G23≤3.00.

In the optical imaging lens assembly of six lens elements of the present invention, the first lens element has a first lens element thickness T1 along the optical axis to satisfy (T1+T6)/G12≤5.80.

In the optical imaging lens assembly of six lens elements of the present invention, TTL is a distance from the object-side surface of the first lens element to an image plane and the third lens element has a third lens element thickness T3 along the optical axis to satisfy TTL/(T3+T6)≤5.00.

In the optical imaging lens assembly of six lens elements of the present invention, an air gap G34 between the third lens element and the fourth lens element along the optical axis to satisfy TTL/(G23+G34)≤8.70.

The optical imaging lens assembly of six lens elements of the present invention satisfies TTL/(G34+G56)≤5.10.

In the optical imaging lens assembly of six lens elements of the present invention, EFL is an effective focal length of the optical imaging lens assembly and the second lens element has a second lens element thickness T2 along the optical axis to satisfy EFL/(T2+T6)≤5.40.

The optical imaging lens assembly of six lens elements of the present invention satisfies EFL/T2≤16.80.

In the optical imaging lens assembly of six lens elements of the present invention, BFL is a distance between the image-side surface of the sixth lens element and an image plane along the optical axis and the fifth lens element has a fifth lens element thickness T5 along the optical axis to satisfy BFL/T5≤3.00.

The optical imaging lens assembly of six lens elements of the present invention satisfies BFL/T6≤2.00.

In the optical imaging lens assembly of six lens elements of the present invention, Tmin is the minimal lens element thickness among the first lens element and the sixth lens element to satisfy ALT/Tmin≤9.70.

The optical imaging lens assembly of six lens elements of the present invention satisfies ALT/G56≤4.30.

In the optical imaging lens assembly of six lens elements of the present invention, Gmax is the maximal air gap among the first lens element and the sixth lens element to satisfy ALT/Gmax≤4.50.

In the optical imaging lens assembly of six lens elements of the present invention, TL is a distance between the object-side surface of the first lens element and the image-side surface of the sixth lens element along the optical axis to satisfy TL/T6≤7.30.

In the optical imaging lens assembly of six lens elements of the present invention, an air gap G45 between the fourth lens element and the fifth lens element along the optical axis to satisfy TL/(G45+G56)≤5.80.

The optical imaging lens assembly of six lens elements of the present invention satisfies TL/(T2+T6)≤5.10.

In the optical imaging lens assembly of six lens elements of the present invention, AAG is a sum of all five air gaps between each lens elements from the first lens element to the sixth lens element along the optical axis to satisfy AAG/T2≤6.10.

The optical imaging lens assembly of six lens elements of the present invention satisfies AAG/Tmin≤6.10.

In the optical imaging lens assembly of six lens elements of the present invention, the fourth lens element has a fourth lens element thickness T4 along the optical axis to satisfy AAG/(T4+T6)≤1.90.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or the region in a vicinity of its circular periphery of one lens element.

FIG. 20 shows the optical data of the first example of the optical imaging lens assembly.

FIG. 21 shows the aspheric surface data of the first example.

FIG. 22 shows the optical data of the second example of the optical imaging lens assembly.

FIG. 23 shows the aspheric surface data of the second example.

FIG. 24 shows the optical data of the third example of the optical imaging lens assembly.

FIG. 25 shows the aspheric surface data of the third example.

FIG. 26 shows the optical data of the fourth example of the optical imaging lens assembly.

FIG. 27 shows the aspheric surface data of the fourth example.

FIG. 28 shows the optical data of the fifth example of the optical imaging lens assembly.

FIG. 29 shows the aspheric surface data of the fifth example.

FIG. 30 shows the optical data of the sixth example of the optical imaging lens assembly.

FIG. 31 shows the aspheric surface data of the sixth example.

FIG. 32 shows the optical data of the seventh example of the optical imaging lens assembly.

FIG. 33 shows the aspheric surface data of the seventh example.

FIG. 34 shows some important ratios in the examples.

FIG. 35 shows some important ratios in the examples.

DETAILED DESCRIPTION

Figure 6:
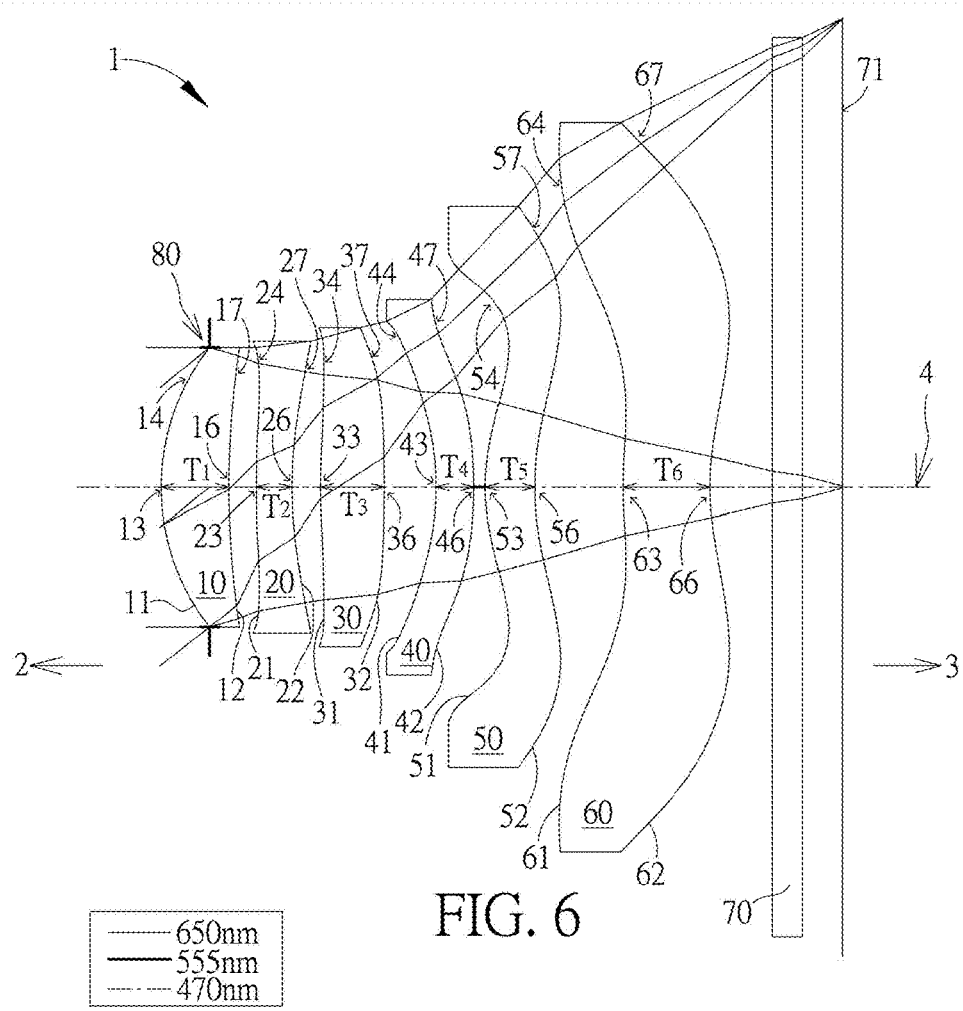
FIG. 6 illustrates a first example of the optical imaging lens assembly of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power calculated by Gaussian optical theory. An object-side/image-side surface refers to the region which allows imaging light passing through, in the drawing, imaging light includes Lc (chief ray) and Lm (marginal ray). As shown in FIG. 1, the optical axis is "I" and the lens element is symmetrical with respect to the optical axis I. The region A that near the optical axis and for light to pass through is the region in a vicinity of the optical axis, and the region C that the marginal ray passing through is the region in a vicinity of a certain lens element's circular periphery. In addition, the lens element may include an extension part E for the lens element to be installed in an optical imaging lens assembly (that is the region outside the region C perpendicular to the optical axis). Ideally speaking, no light would pass through the extension part, and the actual structure and shape of the extension part is not limited to this and may have other variations. For the reason of simplicity, the extension part is not illustrated in the following examples. More, precisely, the method for determining the surface shapes or the region in a vicinity of the optical axis, the region in a vicinity of its circular periphery and other regions is described in the following paragraphs:

1. FIG. 1 is a radial cross-sectional view of a lens element. Before determining boundaries of those aforesaid portions, two referential points should be defined first, middle point and conversion point. The middle point of a surface of a lens element is a point of intersection of that surface and the optical axis. The conversion point is a point on a surface of a lens element, where the tangent line of that point is perpendicular to the optical axis. Additionally, if multiple conversion points appear on one single surface, then these conversion points are sequentially named along the radial direction of the surface with numbers starting from the first conversion point. For instance, the first conversion point (closest one to the optical axis), the second conversion point, and the Nth conversion point (farthest one to the optical axis within the scope of the clear aperture of the surface). The portion of a surface of the lens element between the middle point and the first conversion point is defined as the portion in a vicinity of the optical axis. The portion located radially outside of the Nth conversion point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the conversion point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the middle point and the first conversion point has a convex shape, the portion located radially outside of the first conversion point has a concave shape, and the first conversion point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none conversion point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one conversion point, namely a first conversion point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first conversion point and a second conversion point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second conversion point (portion II).

Referring to a third example depicted in FIG. 5, no conversion point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

As shown in FIG. 6, the optical imaging lens assembly 1 of six lens elements of the present invention, sequentially located from an object side 2 (where an object is located) to an image side 3 along an optical axis 4, has an aperture stop (ape. stop) 80, a first lens element 10, a second lens element 20, a third lens element 30, a fourth lens element 40, a fifth lens element 50, a sixth lens element 60, a filter 70 and an image plane 71. Generally speaking, the first lens element 10, the second lens element 20, the third lens element 30, the fourth lens element 40, the fifth lens element 50 and the sixth lens element 60 may be made of a transparent plastic material but the present invention is not limited to this, and each has an appropriate refractive power. There are exclusively six lens elements, which means the first lens element 10, the second lens element 20, the third lens element 30, the fourth lens element 40, the fifth lens element 50 and the sixth lens element 60, with refractive power in the optical imaging lens assembly 1 of the present invention. The optical axis 4 is the optical axis of the entire optical imaging lens assembly 1, and the optical axis of each of the lens elements coincides with the optical axis of the optical imaging lens assembly 1.

Furthermore, the optical imaging lens assembly 1 includes an aperture stop (ape. stop) 80 disposed in an appropriate position. In FIG. 6, the aperture stop 80 is disposed between the object side 2 and the first lens element 10. When light emitted or reflected by an object (not shown) which is located at the object side 2 enters the optical imaging lens assembly 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50, the sixth lens element 60 and the filter 70. In one embodiments of the present invention, the optional filter 70 may be a filter of various suitable functions, for example, the filter 70 may be an infrared cut filter (IR cut filter), placed between the image-side surface 62 of the sixth lens element 60 and the image plane 71.

Each lens element in the optical imaging lens assembly 1 of the present invention has an object-side surface facing toward the object side 2 as well as an image-side surface facing toward the image side 3. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62. In addition, each object-side surface and image-side surface in the optical imaging lens assembly 1 of the present invention has a part (or portion) in a vicinity of its circular periphery (circular periphery part) away from the optical axis 4 as well as a part in a vicinity of the optical axis (optical axis part) close to the optical axis 4.

Each lens element in the optical imaging lens assembly 1 of the present invention further has a central thickness T on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6. Therefore, the total thickness of all the lens elements in the optical imaging lens assembly 1 along the optical axis 4 is ALT=T1+T2+T3+T4+T5+T6.

In addition, between two adjacent lens elements in the optical imaging lens assembly 1 of the present invention there may be an air gap along the optical axis 4. For example, there is an air gap G12 disposed between the first lens element 10 and the second lens element 20, an air gap G23 disposed between the second lens element 20 and the third lens element 30, an air gap G34 disposed between the third lens element 30 and the fourth lens element 40, an air gap G45 disposed between the fourth lens element 40 and the fifth lens element 50 as well as there is an air gap G56 disposed between the fifth lens element 50 and the sixth lens element 60. Therefore, the sum of total five air gaps between adjacent lens elements from the first lens element 10 to the sixth lens element 60 along the optical axis 4 is AAG=G12+G23+G34+G45+G56.

In addition, the distance from the object-side surface 11 of the first lens element 10 to the image-side surface 62 of the sixth lens element 60 along the optical axis 4 is TL. The distance between the object-side surface 11 of the first lens element 10 to the image plane 71, namely the total length of the optical imaging lens assembly along the optical axis 4 is TTL; the effective focal length of the optical imaging lens assembly is EFL; the distance between the image-side surface 62 of the sixth lens element 60 and the image plane 71 along the optical axis 4 is BFL.

Tmax is the maximal lens element thickness among the first lens element 10, the second lens element 20, the third lens element 30, the fourth lens element 40, the fifth lens element 50, the sixth lens element 60. Tmin is the minimal lens element thickness among the first lens element 10, the second lens element 20, the third lens element 30, the fourth lens element 40, the fifth lens element 50, the sixth lens element 60. Gmax is the maximal air gap among the first lens element 10, the second lens element 20, the third lens element 30, the fourth lens element 40, the fifth lens element 50, the sixth lens element 60.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the focal length of the sixth lens element 60 is f6; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the refractive index of the sixth lens element 60 is n6; the Abbe number of the first lens element 10 is ν1; the Abbe number of the second lens element 20 is ν2; the Abbe number of the third lens element 30 is ν3; and the Abbe number of the fourth lens element 40 is ν4; the Abbe number of the fifth lens element 50 is ν5; and the Abbe number of the sixth lens element 60 is ν6.

First Example

Figures 7A, 7B, 7C, 7D:
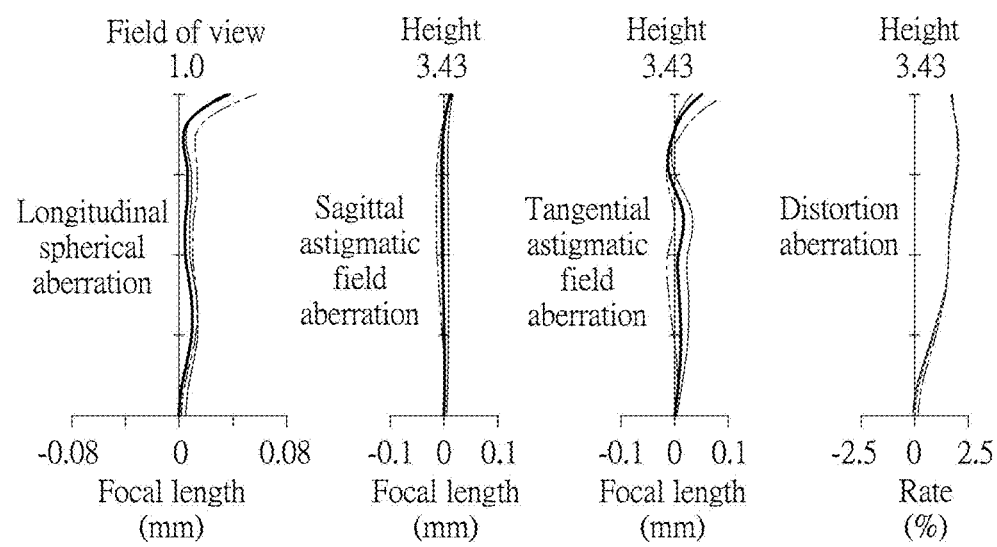
FIG. 7A illustrates the longitudinal spherical aberration on the image plane of the first example.
FIG. 7B illustrates the astigmatic aberration on the sagittal direction of the first example.
FIG. 7C illustrates the astigmatic aberration on the tangential direction of the first example.
FIG. 7D illustrates the distortion aberration of the first example.

Please refer to FIG. 6 which illustrates the first example of the optical imaging lens assembly 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stands for "image height".

The optical imaging lens assembly 1 of the first example has six lens elements 10 to 60 with refractive power. The optical imaging lens assembly 1 also has a filter 70, an aperture stop 80, and an image plane 71. The aperture stop 80 is provided between the object side 2 and the first lens element 10. The filter 70 may be used for preventing specific wavelength light (such as the infrared light) reaching the image plane to adversely affect the imaging quality.

The first lens element 10 has positive refractive power. The object-side surface 11 facing toward the object side 2 has a convex part 13 in the vicinity of the optical axis and a convex part 14 in a vicinity of its circular periphery. The image-side surface 12 facing toward the image side 3 has a concave part 16 in the vicinity of the optical axis and a concave part 17 in a vicinity of its circular periphery. Besides, both the object-side surface 11 and the image-side surface 12 are aspherical surfaces.

The second lens element 20 has negative refractive power. The object-side surface 21 facing toward the object side 2 has a convex part 23 in the vicinity of the optical axis and a concave part 24 in a vicinity of its circular periphery. The image-side surface 22 facing toward the image side 3 has a concave part 26 in the vicinity of the optical axis and a concave part 27 in a vicinity of its circular periphery. Besides, both the object-side surface 21 and the image-side surface 22 of the second lens element 20 are aspherical surfaces.

The third lens element 30 has positive refractive power. The object-side surface 31 facing toward the object side 2 has a convex part 33 in the vicinity of the optical axis and a concave part 34 in a vicinity of its circular periphery. The image-side surface 32 facing toward the image side 3 has a convex part 36 in the vicinity of the optical axis and a convex part 37 in a vicinity of its circular periphery. Besides, both the object-side surface 31 and the image-side surface 32 of the third lens element 30 are aspherical surfaces.

The fourth lens element 40 has negative refractive power. The object-side surface 41 facing toward the object side 2 has a concave part 43 in the vicinity of the optical axis and a concave part 44 in a vicinity of its circular periphery. The image-side surface 42 facing toward the image side 3 has a convex part 46 in the vicinity of the optical axis and a convex part 47 in a vicinity of its circular periphery. Besides, both the object-side surface 41 and the image-side surface 42 of the fourth lens element 40 are aspherical surfaces.

The fifth lens element 50 has positive refractive power. The object-side surface 51 facing toward the object side 2 has a convex part 53 in the vicinity of the optical axis and a concave part 54 in a vicinity of its circular periphery. The image-side surface 52 facing toward the image side 3 has a concave part 56 in the vicinity of the optical axis and a convex part 57 in a vicinity of its circular periphery. Besides, both the object-side surface 51 and the image-side surface 52 of the fifth lens element 50 are aspherical surfaces.

The sixth lens element 60 has negative refractive power. The object-side surface 61 facing toward the object side 2 has a convex part 63 in the vicinity of the optical axis and a concave part 64 in a vicinity of its circular periphery. The image-side surface 62 facing toward the image side 3 has a concave part 66 in the vicinity of the optical axis and a convex part 67 in a vicinity of its circular periphery. Both the object-side surface 61 and the image-side surface 62 of the sixth lens element 60 are aspherical surfaces. The filter 70 is disposed between the image-side surface 62 of the sixth lens element 60 and the image plane 71.

In the first lens element 10, the second lens element 20, the third lens element 30, the fourth lens element 40, the fifth lens element 50 and the sixth lens element 60 of the optical imaging lens element 1 of the present invention, there are 12 surfaces, such as the object-side surfaces 11/21/31/41/51/61 and the image-side surfaces 12/22/32/42/52/62. If a surface is aspherical, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant;
$a_i$ is the aspheric coefficient of the $i^{th}$ order.

The optical data of the first example of the optical imaging lens assembly 1 are shown in FIG. 20 while the aspheric surface data are shown in FIG. 21. In the present examples of the optical imaging lens assembly, the f-number of the entire optical lens element system is Fno, EFL is the effective focal length, HFOV stands for the half field of view which is half of the field of view of the entire optical lens element system, and the unit for the curvature radius, the thickness and the focal length is in millimeters (mm). TTL is 4.982 mm. Fno is 2.049. HFOV is 40.329 degrees.

Second Example

Figure 8:
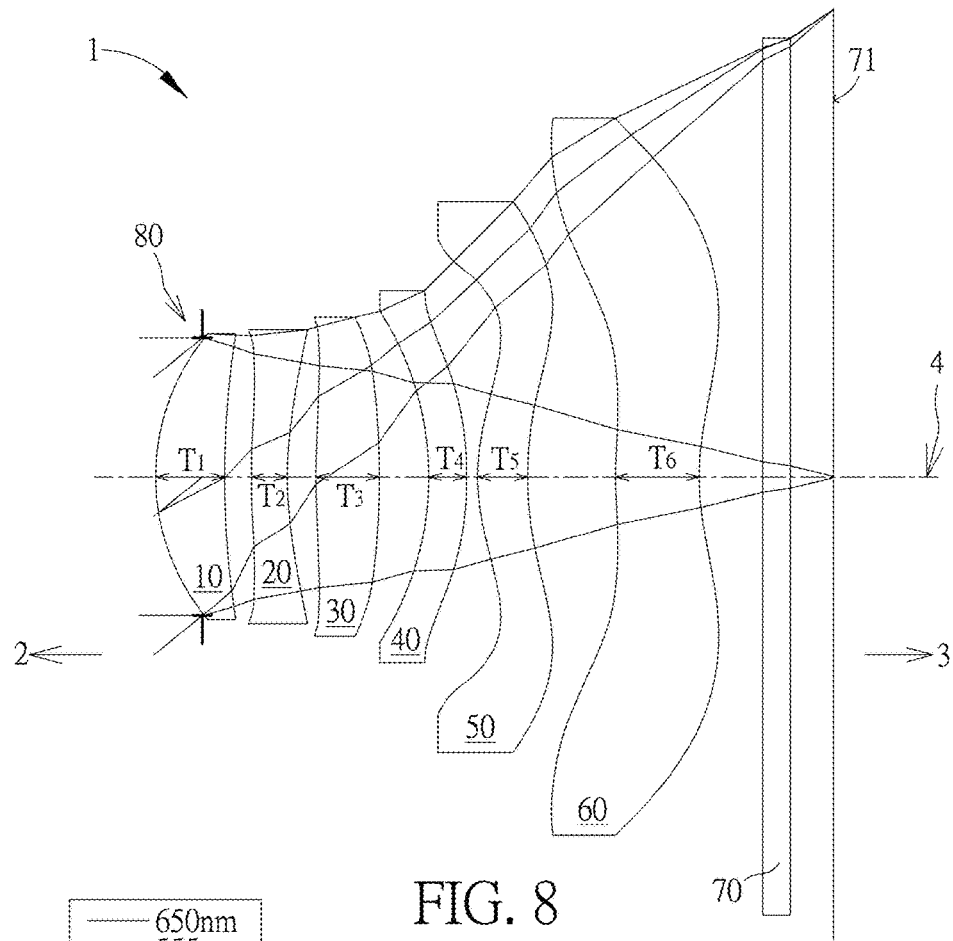
FIG. 8 illustrates a second example of the optical imaging lens assembly of six lens elements of the present invention.
Figures 9A, 9B, 9C, 9D:
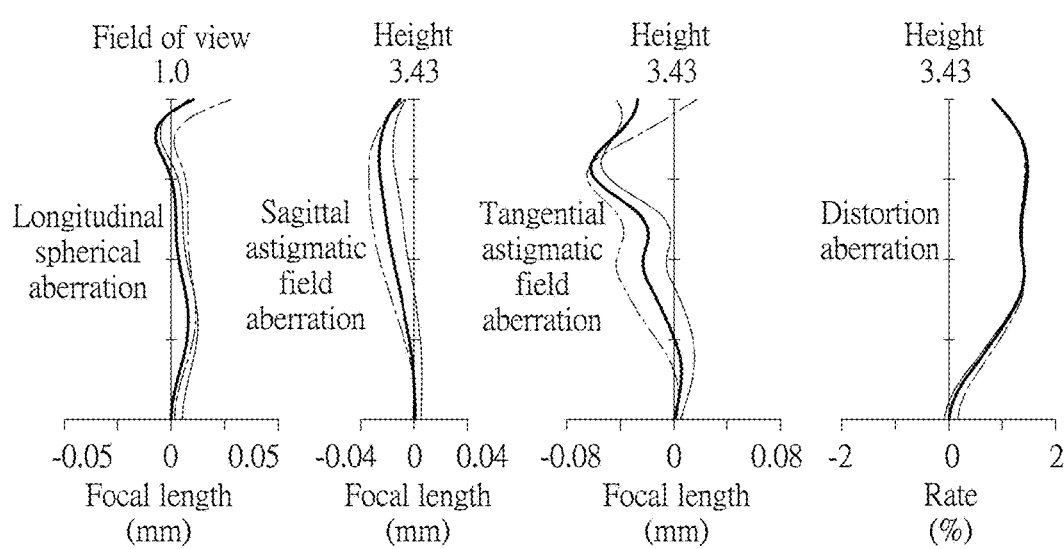
FIG. 9A illustrates the longitudinal spherical aberration on the image plane of the second example.
FIG. 9B illustrates the astigmatic aberration on the sagittal direction of the second example.
FIG. 9C illustrates the astigmatic aberration on the tangential direction of the second example.
FIG. 9D illustrates the distortion aberration of the second example.

Please refer to FIG. 8 which illustrates the second example of the optical imaging lens assembly 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the part in a vicinity of the optical axis and the part in a vicinity of its circular periphery will be omitted in the following examples. Please refer to FIG. 9A for the longitudinal spherical aberration on the image plane 71 of the second example, please refer to FIG. 9B for the astigmatic aberration on the sagittal direction, please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example.

The optical data of the second example of the optical imaging lens assembly are shown in FIG. 22 while the aspheric surface data are shown in FIG. 23. TTL is 4.972 mm. Fno is 2.059. HFOV is 39.016 degrees. In particular, 1) the TTL of the second example is shorter than that of the first example of the present invention, 2) the Fno of the second example is larger than that of the first example of the present invention, 3) HFOV of the second example is better than that of the first example of the present invention.

Third Example

Figure 10:
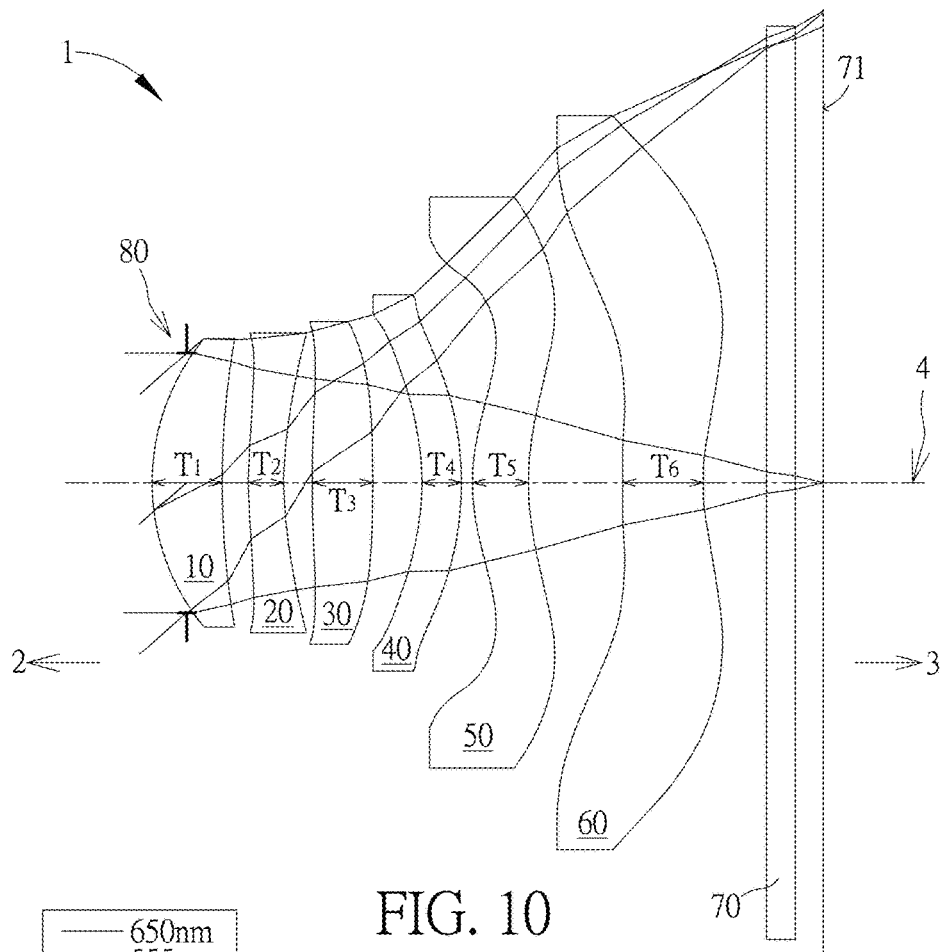
FIG. 10 illustrates a third example of the optical imaging lens assembly of six lens elements of the present invention.
Figures 11A, 11B, 11C, 11D:
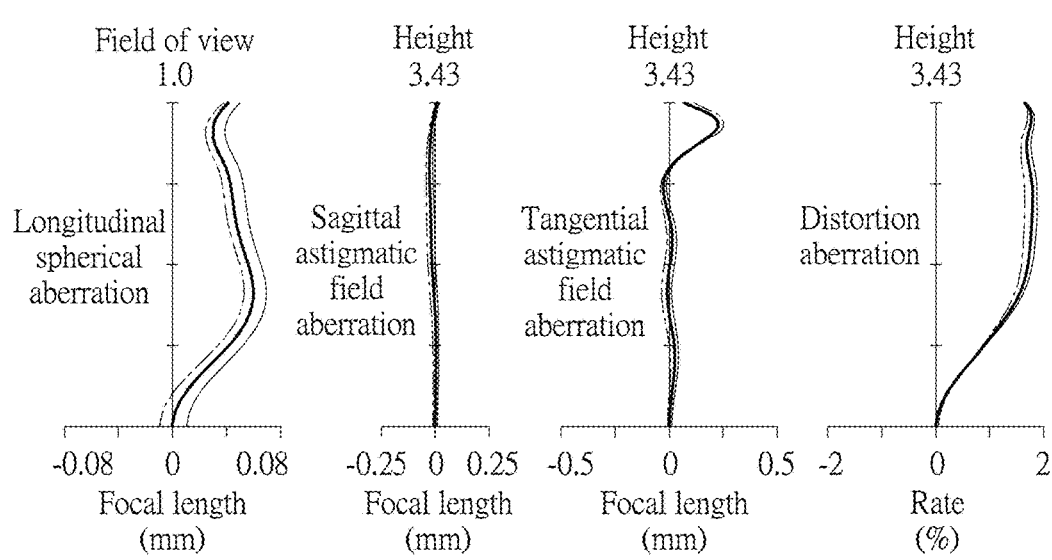
FIG. 11A illustrates the longitudinal spherical aberration on the image plane of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens assembly 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example.

The optical data of the third example of the optical imaging lens assembly are shown in FIG. 24 while the aspheric surface data are shown in FIG. 25. TTL is 4.814 mm. Fno is 2.0588. HFOV is 42.3596 degrees. In particular, 1) the TTL of the third example is shorter than that of the first example of the present invention, 2) the Fno of the third example is larger than that of the first example of the present invention, 3) HFOV of the third example is better than that of the first example of the present invention.

Fourth Example

Figure 12:
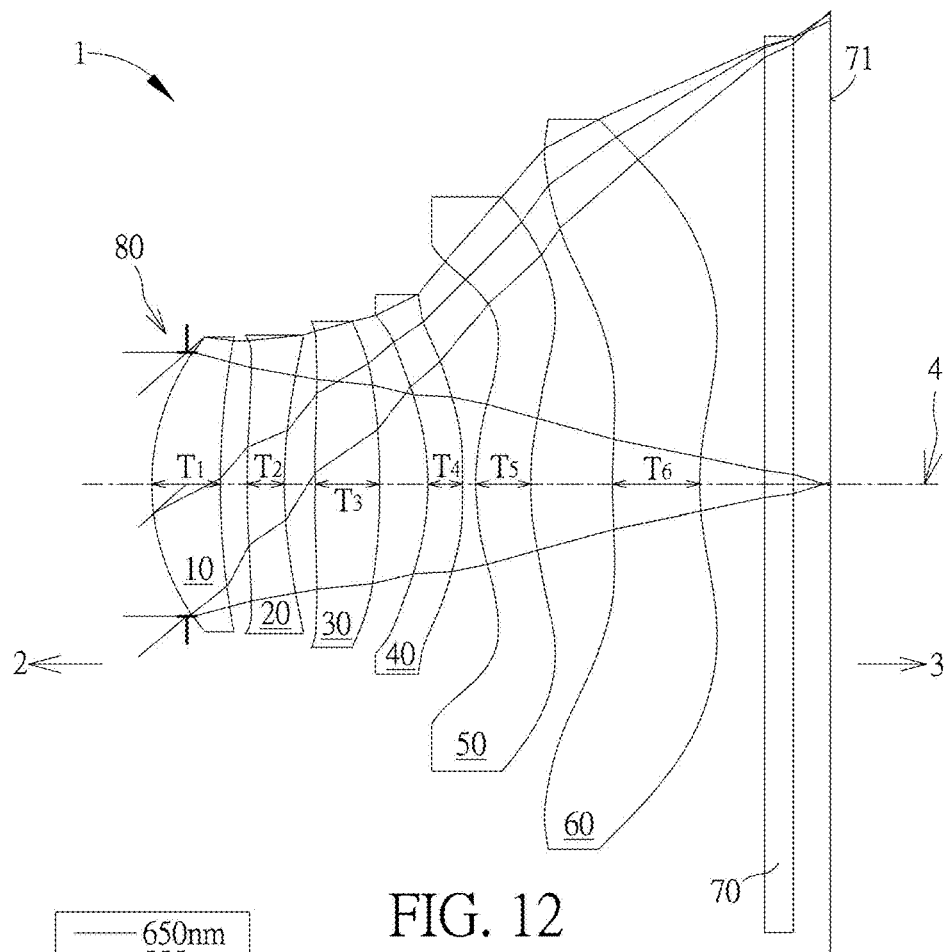
FIG. 12 illustrates a fourth example of the optical imaging lens assembly of six lens elements of the present invention.
Figures 13A, 13B, 13C, 13D:
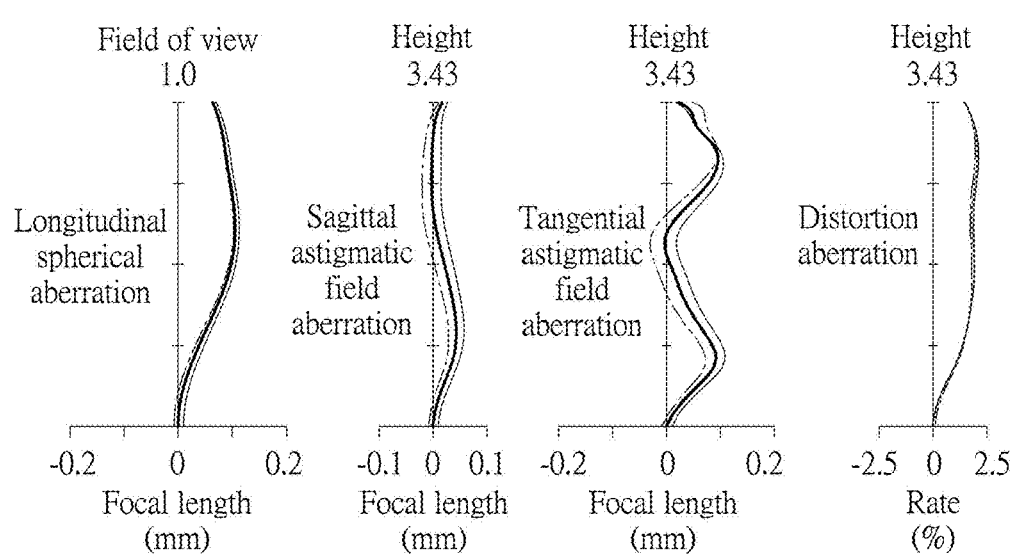
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens assembly 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example.

The optical data of the fourth example of the optical imaging lens assembly are shown in FIG. 26 while the aspheric surface data are shown in FIG. 27. TTL is 4.855 mm. Fno is 2.0488. HFOV is 40.2938 degrees. In particular, the TTL of the fourth example is shorter than that of the first example of the present invention.

Fifth Example

Figure 14:
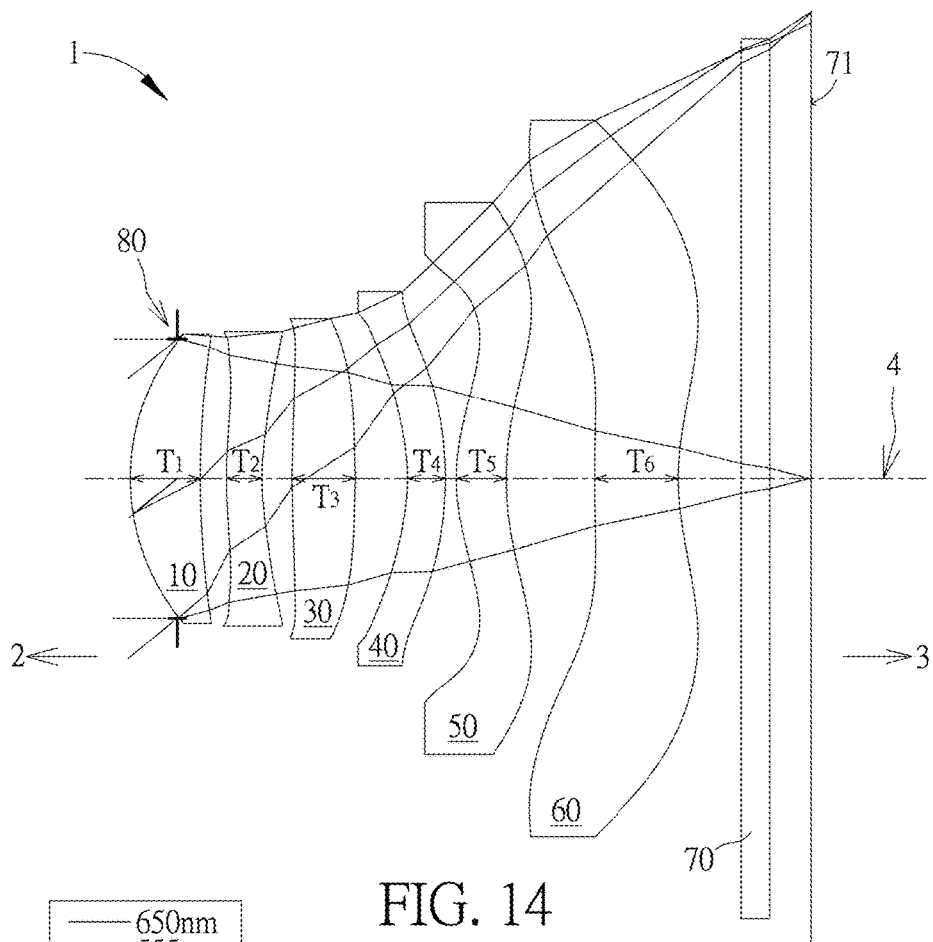
FIG. 14 illustrates a fifth example of the optical imaging lens assembly of six lens elements of the present invention.
Figures 15A, 15B, 15C, 15D:
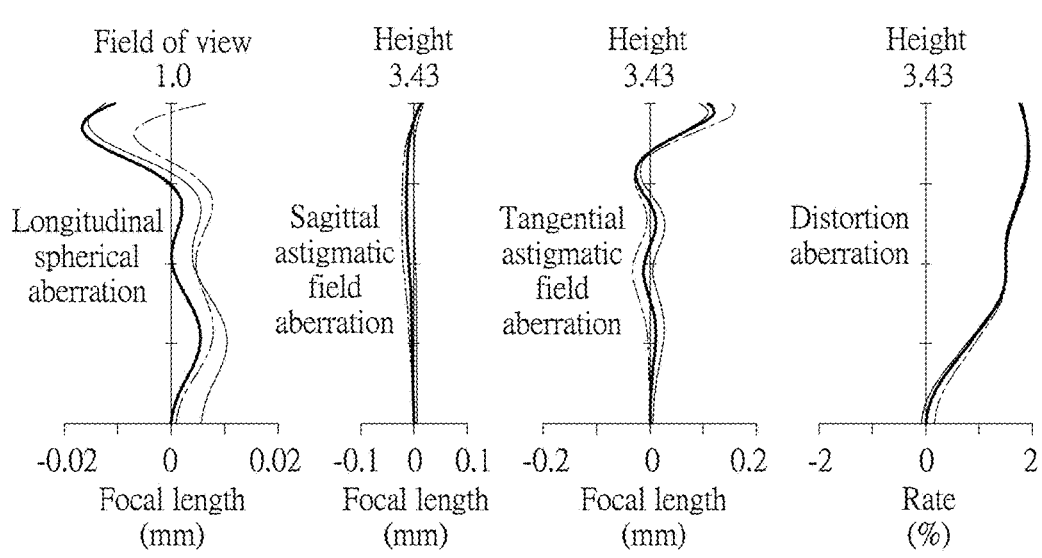
FIG. 15A illustrates the longitudinal spherical aberration on the image plane of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens assembly 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example.

The optical data of the fifth example of the optical imaging lens assembly are shown in FIG. 28 while the aspheric surface data are shown in FIG. 29. TTL is 4.99 mm. Fno is 2.0487. HFOV is 40.335 degrees. In particular, the HFOV of the fifth example is better than that of the first example of the present invention.

Sixth Example

Figure 16:
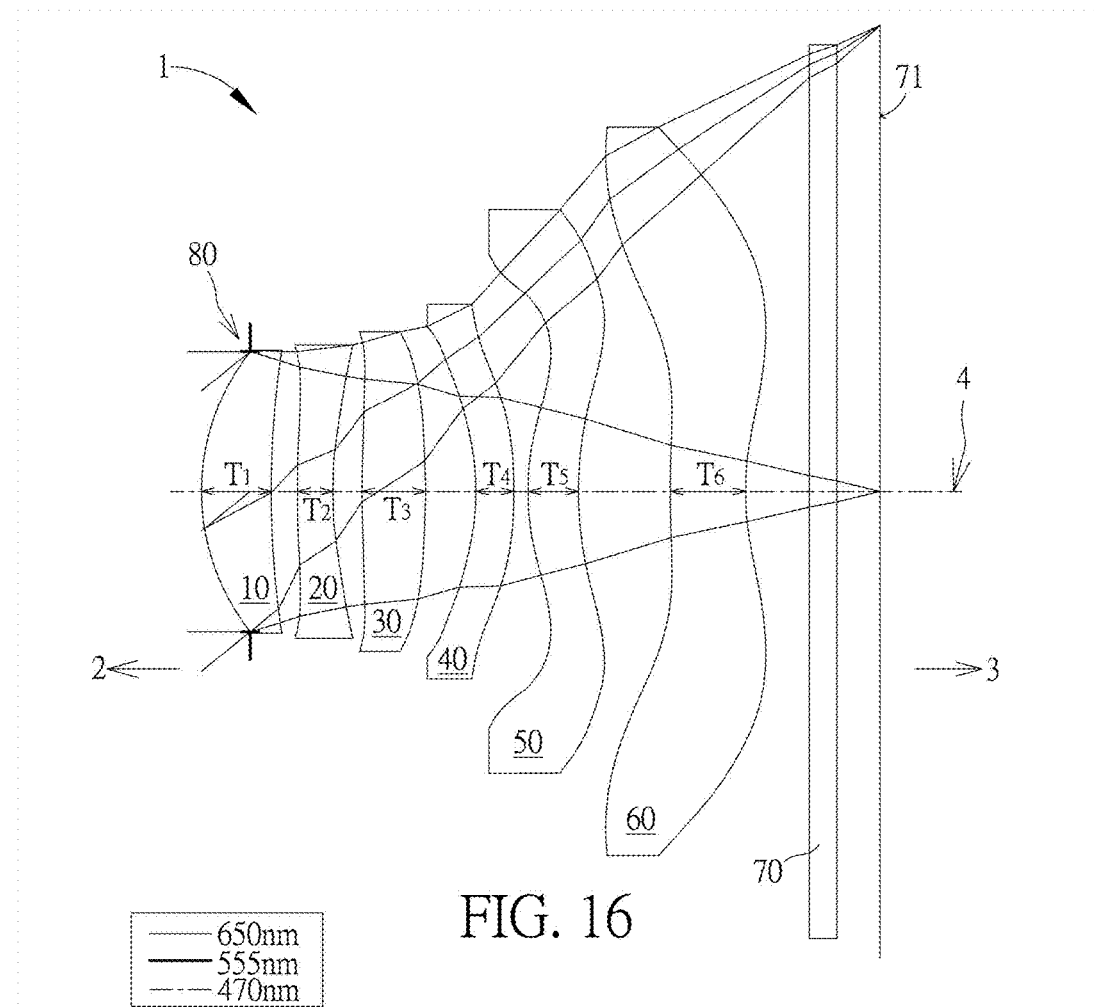
FIG. 16 illustrates a sixth example of the optical imaging lens assembly of six lens elements of the present invention.
Figures 17A, 17B, 17C, 17D:
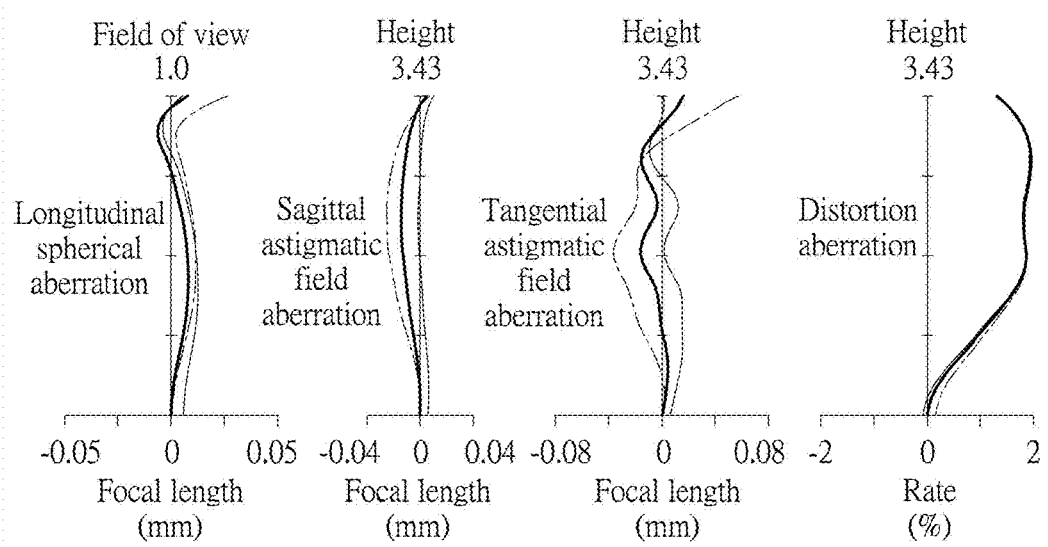
FIG. 17A illustrates the longitudinal spherical aberration on the image plane of the sixth example.
FIG. 17B illustrates the astigmatic aberration on the sagittal direction of the sixth example.
FIG. 17C illustrates the astigmatic aberration on the tangential direction of the sixth example.
FIG. 17D illustrates the distortion aberration of the sixth example.

Please refer to FIG. 16 which illustrates the sixth example of the optical imaging lens assembly 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example.

The optical data of the sixth example of the optical imaging lens assembly are shown in FIG. 30 while the aspheric surface data are shown in FIG. 31. TTL is 4.978 mm. Fno is 2.0487. HFOV is 40.4391 degrees. In particular, 1) the TTL of the sixth example is shorter than that of the first example of the present invention, 2) the HFOV of the sixth example is better than that of the first example of the present invention.

Seventh Example

Figure 18:
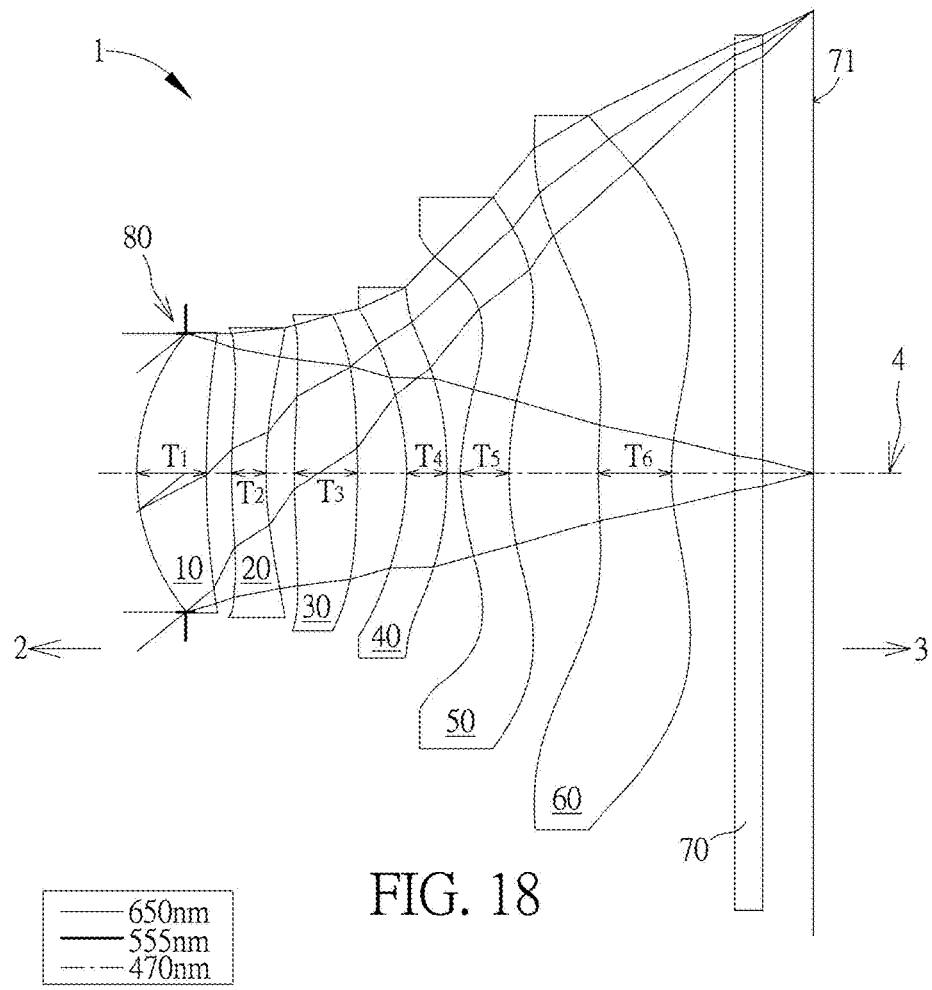
FIG. 18 illustrates a seventh example of the optical imaging lens assembly of six lens elements of the present invention.
Figures 19A, 19B, 19C, 19D:
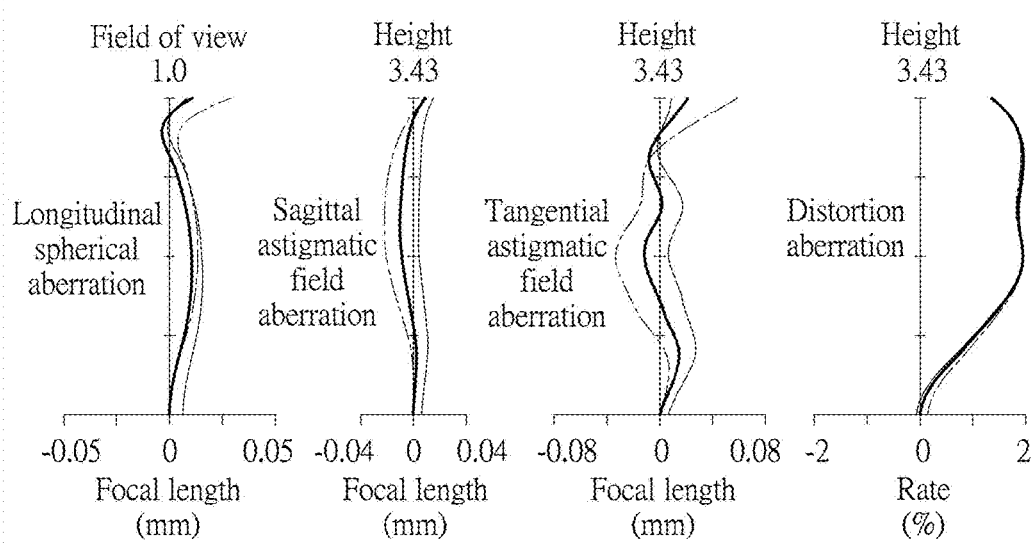
FIG. 19A illustrates the longitudinal spherical aberration on the image plane of the seventh example.
FIG. 19B illustrates the astigmatic aberration on the sagittal direction of the seventh example.
FIG. 19C illustrates the astigmatic aberration on the tangential direction of the seventh example.
FIG. 19D illustrates the distortion aberration of the seventh example.

Please refer to FIG. 18 which illustrates the seventh example of the optical imaging lens assembly 1 of the present invention. Please refer to FIG. 19A for the longitudinal spherical aberration on the image plane 71 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in the seventh example are similar to those in the first example, but the optical data such as the curvature radius, the refractive power, the lens thickness, the lens focal length, the aspheric surface or the back focal length in this example are different from the optical data in the first example.

The optical data of the seventh example of the optical imaging lens assembly are shown in FIG. 32 while the aspheric surface data are shown in FIG. 33. TTL is 5.002 mm. Fno is 2.0487. HFOV is 40.2916 degrees. The lens thickness difference of this example in the optical region and in its periphery region is smaller than that of the first example of the present invention so they are easier to be fabricated and have better yield.

Some important ratios in each example are shown in FIG. 34 and in FIG. 35. The thickness of the filter 70 along the optical axis 4 is TF; the distance between the filter 70 to the image plane 71 along the optical axis 4 is GFP; the distance between the image-side surface 62 of the sixth lens element 60 and the image plane 71 along the optical axis 4 is BFL.

In the light of the above examples, the inventors observe at least the following features of the lens arrangement of the present invention and the corresponding efficacy.

The present invention finely tunes the regions in a vicinity of the optical axis and the regions in a vicinity of its circular periphery. For instance:
1. The first object-side surface of the first lens element has a convex portion in a vicinity of the optical axis and a concave portion in a vicinity of its periphery to help the concentration of the light effectively. To go with the second lens element of negative refractive power and of an object-side surface with a concave portion in a vicinity of its periphery facilitates the correction of the main aberration which is caused by the first lens element.
2. The third lens element has an object-side surface with a concave portion in a vicinity of its periphery and the fourth lens element has an image-side surface with a convex portion in a vicinity of the optical-axis and with a convex portion in a vicinity of its periphery to facilitate the correction of the main aberration which is caused by the first two lens elements to obtain the results of enhanced imaging quality.
3. The fifth lens element has positive refractive power and an image-side surface with a concave portion in a vicinity of the optical-axis to correct the aberration. To further go with the sixth lens element of an image-side surface with a concave portion in a vicinity of the optical-axis, this design goes with each other to reduce the length of the optical imaging lens assembly and to ensure good imaging quality.

In order to diminish the total length, the present invention proposes to reduce the lens thickness and air gaps between adjacent lens elements. Taking the assembly fabrication and imaging quality into consideration, the lens thickness should suit air gaps so the inventors further discover that there are some better ratio ranges for different data according to the above various important ratios. Better ratio ranges help the designers to design a better optical performance and an effectively reduce length of a practically possible optical imaging lens assembly. For example:

When anyone of the following conditional formulae is satisfied, the numerator may become smaller when the denominator is kept unchanged to reduce the total volume of the optical imaging lens assembly. When any one of the following conditional formulae is further satisfied, better imaging quality is possible.
1. $ALT/(G56+T6) \leq 2.60$. It is preferably $1.90 \leq ALT/(G56+T6) \leq 2.60$.
2. $Tmax/G12 \leq 3.30$. It is preferably $2.80 \leq Tmax/G12 \leq 3.30$.
3. $Tmax/G23 \leq 3.00$. It is preferably $2.50 \leq Tmax/G23 \leq 3.00$.
4. $(T1+T6)/G12 \leq 5.80$. It is preferably $5.50 \leq (T1+T6)/G12 \leq 5.80$.
5. $BFL/T5 \leq 3.00$. It is preferably $2.00 \leq BFL/T5 \leq 3.00$.
6. $BFL/T6 \leq 2.00$. It is preferably $1.30 \leq BFL/T6 \leq 2.00$.
7. $ALT/Tmin \leq 9.70$. It is preferably $9.40 \leq ALT/Tmin \leq 9.70$.
8. $ALT/G56 \leq 4.30$. It is preferably $3.60 \leq ALT/G56 \leq 4.30$.
9. $ALT/Gmax \leq 4.50$. It is preferably $3.60 \leq ALT/Gmax \leq 4.50$.
10. $TL/T6 \leq 7.30$. It is preferably $6.30 \leq TL/T6 \leq 7.30$.
11. $TL/(G45+G56) \leq 5.80$. It is preferably $5.10 \leq TL/(G45+G56) \leq 5.80$.
12. $TL/(T2+T6) \leq 5.10$. It is preferably $4.40 \leq TL/(T2+T6) \leq 5.10$.
13. $AAG/T2 \leq 6.10$. It is preferably $5.30 \leq AAG/T2 \leq 6.10$.
14. $AAG/Tmin \leq 6.10$. It is preferably $5.50 \leq AAG/Tmin \leq 6.10$.
15. $AAG/(T4+T6) \leq 1.90$. It is preferably $1.60 \leq AAG/(T4+T6) \leq 1.90$.

A smaller EFL helps enlarge the field angle so the EFL is preferably smaller. The following conditions help the enlargement of the field angle in order to reduce the total length of the optical imaging lens assembly when reducing the thickness of the optical imaging lens assembly.
1. $EFL/(T2+T6) \leq 5.40$. It is preferably $4.30 \leq EFL/(T2+T6) \leq 5.40$.
2. $EFL/T2 \leq 16.80$. It is preferably $14.40 \leq EFL/T2 \leq 16.80$.

The optical parameters and the total length of the optical imaging lens set together keep a suitable range so the parameters are not too small to fabricate or so great to enlarge the total length of the optical imaging lens set.
1. $TTL/(T3+T6) \leq 5.00$. It is preferably $4.40 \leq TTL/(T3+T6) \leq 5.00$.
2. $TTL/(G23+G34) \leq 8.70$. It is preferably $8.30 \leq TTL/(G23+G34) \leq 8.70$.
3. $TTL/(G34+G56) \leq 5.10$. It is preferably $4.60 \leq TTL/(G34+G56) \leq 5.10$.

In the light of the unpredictability of the optical imaging lens assembly, the present invention suggests the above principles to have a shorter total length of the optical imaging lens assembly, a larger aperture available, a wider field angle, better imaging quality or a better fabrication yield to overcome the drawbacks of prior art.

The above-mentioned one or more conditions may be optionally combined in the embodiments of the present invention to facilitate the design of the present invention. In the light of the unpredictability of the optical imaging lens assembly, the present invention suggests the above principles to have a shorter telescopic length of the optical imaging lens assembly, a larger aperture available, better imaging quality or a better fabrication yield to overcome the drawbacks of prior art.

The above limitations may be properly combined at the discretion of persons who practice the present invention and they are not limited as shown above. In addition to the above ratios, the curvatures of each lens element or multiple lens elements may be fine-tuned to result in more fine structures to enhance the system performance or the resolution control. For example, the object-side surface of the first lens element may additionally have a convex part in the vicinity of the optical axis. The above limitations may be properly combined in the embodiments without causing inconsistency.

In each one of the above examples, the longitudinal spherical aberration, the astigmatic aberration and the distortion aberration meet requirements in use. By observing three representative wavelengths of red, green and blue, it is suggested that all curves of every wavelength are close to one another, which reveals off-axis light of different heights of every wavelength all concentrates on the image plane, and deviations of every curve also reveal that off-axis light of different heights are well controlled so the examples do improve the spherical aberration, the astigmatic aberration and the distortion aberration. In addition, by observing the imaging quality data the distances amongst the three representing different wavelengths are pretty close to one another, which means the present invention is able to concentrate light of the three representing different wavelengths so that the aberration is greatly improved. Given the above, the present invention provides outstanding imaging quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical lens assembly, from an object side toward an image side in order along an optical axis comprising: a first lens element, a second lens element, a third lens element, a fourth lens element, a fifth lens element and a sixth lens element, said first lens element to said sixth lens element each having an object-side surface facing toward the object side as well as an image-side surface facing toward the image side, wherein:
said first lens element has an image-side surface with a concave portion in a vicinity of said optical-axis and with a concave portion in a vicinity of its periphery;
said second lens element has negative refractive power and an object-side surface with a concave portion in a vicinity of its periphery;
said third lens element has an object-side surface with a concave portion in a vicinity of its periphery;
said fourth lens element has an image-side surface with a convex portion in a vicinity of said optical-axis and with a convex portion in a vicinity of its periphery;
said fifth lens element has positive refractive power and an image-side surface with a concave portion in a vicinity of said optical-axis; and
said sixth lens element has an image-side surface with a concave portion in a vicinity of said optical-axis;
the optical imaging lens assembly exclusively has six lens elements with refractive power, ALT is a total thickness of all said six lens elements, an air gap G56 is disposed between said fifth lens element and said sixth lens element and said sixth lens element has a sixth lens element thickness T6 to satisfy ALT/(G56+T6)≤2.6.

2. The optical imaging lens assembly of claim 1, wherein Tmax is the maximal lens element thickness among said first lens element and said sixth lens element and an air gap G12 between said first lens element and said second lens element along said optical axis to satisfy Tmax/G12≤3.30.

3. The optical imaging lens assembly of claim 1, wherein Tmax is the maximal lens element thickness among said first lens element and said sixth lens element and an air gap G23 between said second lens element and said third lens element along said optical axis to satisfy Tmax/G23≤3.00.

4. The optical imaging lens assembly of claim 1, wherein said first lens element has a first lens element thickness T1 along said optical axis and said an air gap G12 between said first lens element and said second lens element along said optical axis to satisfy (T1+T6)/G12≤5.80.

5. The optical imaging lens assembly of claim 1, wherein TTL is a distance from said object-side surface of said first lens element to an image plane and said third lens element has a third lens element thickness T3 along said optical axis to satisfy TTL/(T3+T6)≤5.00.

6. The optical imaging lens assembly of claim 1, wherein TTL is a distance from said object-side surface of said first lens element to an image plane, an air gap G23 between said second lens element and said third lens element along said optical axis and an air gap G34 between said third lens element and said fourth lens element along said optical axis to satisfy TTL/(G23+G34)≤8.70.

7. The optical imaging lens assembly of claim 1, wherein said TTL is a distance from said object-side surface of said first lens element to an image plane and an air gap G34 between said third lens element and said fourth lens element along said optical axis to satisfy TTL/(G34+G56)≤5.10.

8. The optical imaging lens assembly of claim 1, wherein EFL is an effective focal length of the optical imaging lens assembly and said second lens element has a second lens element thickness T2 along said optical axis to satisfy EFL/(T2+T6)≤5.40.

9. The optical imaging lens assembly of claim 1, wherein EFL is an effective focal length of the optical imaging lens assembly and said second lens element has a second lens element thickness T2 along said optical axis to satisfy EFL/T2≤16.80.

10. The optical imaging lens assembly of claim 1, wherein BFL is a distance between said image-side surface of said sixth lens element and an image plane along said optical axis and said fifth lens element has a fifth lens element thickness T5 along said optical axis to satisfy BFL/T5≤3.00.

11. The optical imaging lens assembly of claim 1, wherein BFL is a distance between said image-side surface of said sixth lens element and an image plane along said optical axis to satisfy BFL/T6≤2.00.

12. The optical imaging lens assembly of claim 1, wherein Tmin is the minimal lens element thickness among said first lens element and said sixth lens element to satisfy ALT/Tmin≤9.70.

13. The optical imaging lens assembly of claim 1 satisfying ALT/G56≤4.30.

14. The optical imaging lens assembly of claim 1, wherein Gmax is the maximal air gap among said first lens element and said sixth lens element to satisfy ALT/Gmax≤4.50.

15. The optical imaging lens assembly of claim 1, wherein TL is a distance between said object-side surface of said first lens element and said image-side surface of said sixth lens element along said optical axis to satisfy TL/T6≤7.30.

16. The optical imaging lens assembly of claim 1, wherein TL is a distance between said object-side surface of said first lens element and said image-side surface of said sixth lens element along said optical axis and an air gap G45 between said fourth lens element and said fifth lens element along said optical axis to satisfy TL/(G45+G56)≤5.80.

17. The optical imaging lens assembly of claim 1, wherein TL is a distance between said object-side surface of said first lens element and said image-side surface of said sixth lens element along said optical axis and said second lens element has a second lens element thickness T2 along said optical axis to satisfy TL/(T2+T6)≤5.10.

18. The optical imaging lens assembly of claim 1, wherein AAG is a sum of all five air gaps between each lens elements from said first lens element to said sixth lens element along said optical axis and said second lens element has a second lens element thickness T2 along said optical axis to satisfy AAG/T2≤6.10.

19. The optical imaging lens assembly of claim 1, wherein AAG is a sum of all five air gaps between each lens elements from said first lens element to said sixth lens element along said optical axis and Tmin is the minimal lens element thickness among said first lens element and said sixth lens element to satisfy AAG/Tmin≤6.10.

20. The optical imaging lens assembly of claim 1, wherein AAG is a sum of all five air gaps between each lens elements from said first lens element to said sixth lens element along said optical axis and said fourth lens element has a fourth lens element thickness T4 along said optical axis to satisfy AAG/(T4+T6)≤1.90.

* * * * *